United States Patent
Field et al.

(10) Patent No.: US 7,122,088 B2
(45) Date of Patent: Oct. 17, 2006

(54) METHOD AND APPARATUS FOR VIBRATION WELDING OF THERMOPLASTIC COMPONENTS

(75) Inventors: Stephen Field, Ottawa (CA); Michael Glover, Ottawa (CA)

(73) Assignee: Bystronic Solution Centre Inc., Ontario (CA)

( * ) Notice: Subject to any disclaimer, the term of this patent is extended or adjusted under 35 U.S.C. 154(b) by 34 days.

(21) Appl. No.: 10/473,677

(22) PCT Filed: Jun. 7, 2002

(86) PCT No.: PCT/CA02/00842

§ 371 (c)(1),
(2), (4) Date: Sep. 30, 2003

(87) PCT Pub. No.: WO02/098635

PCT Pub. Date: Dec. 12, 2002

(65) Prior Publication Data

US 2004/0108040 A1  Jun. 10, 2004

(30) Foreign Application Priority Data

Jun. 7, 2001 (CA) ................................ 2349795

(51) Int. Cl.
*B32B 37/00* (2006.01)
(52) U.S. Cl. .................. 156/73.5; 156/64; 156/580
(58) Field of Classification Search ............ 156/64, 156/73.5, 73.6, 358, 580; 264/68; 228/112.1, 228/2.1
See application file for complete search history.

(56) References Cited

U.S. PATENT DOCUMENTS

| | | | | |
|---|---|---|---|---|
| 4,090,799 | A | 5/1978 | Crotti et al. | 403/401 |
| 5,902,657 | A | 5/1999 | Hanson et al. | 428/36.92 |
| 6,604,668 | B1 * | 8/2003 | Crasser | 228/112.1 |
| 6,673,175 | B1 * | 1/2004 | Brooks | 156/64 |

FOREIGN PATENT DOCUMENTS

| | | |
|---|---|---|
| DE | 198 09 956 | 9/1999 |
| DE | 199 38 099 | 2/2001 |
| FR | 1 371 737 | 9/1964 |
| FR | 2 425 608 | 12/1979 |
| GB | 2 033 394 | 5/1980 |
| WO | 01 12420 | 2/2001 |

* cited by examiner

*Primary Examiner*—James Sells
(74) *Attorney, Agent, or Firm*—Wenderoth, Lind & Ponack, L.L.P.

(57) ABSTRACT

Vibratory welded connections are formed between first and second members (32, 33) of thermoplastic material by interposing a junction piece (47) of similar material and vibrating the junction piece (47) at high speed while pressing the first second members (32,33) in a controlled manner against opposite sides of the junction piece (47). Friction created by the vibration generates heat which melts a small amount of material at the engaging surfaces which upon cooling provides a strong welded joint having minimal flash. Entire frame systems such as window-frames can be fabricated by an apparatus system (120) which forms a friction welded joint between adjacent ends of the frame members (134, 135, 136, 137). Furthermore the frame can be fabricated around a panel such as a glazing panel. The welded connections formed by the system do not mar the finish of the frame members and produce no unsightly flash bead requiring subsequent machining steps for its removal.

33 Claims, 38 Drawing Sheets

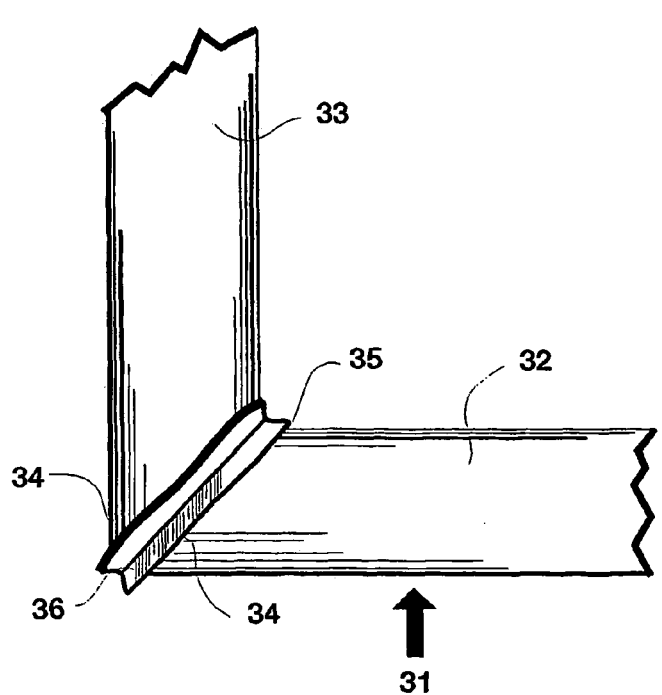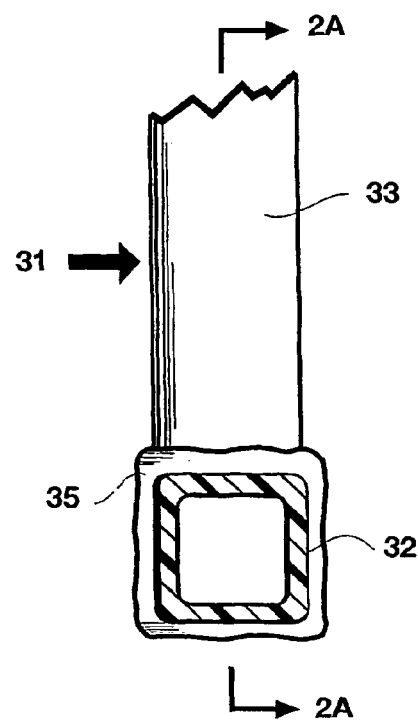
Figure 1A
Prior Art
Figure 1B
Prior Art

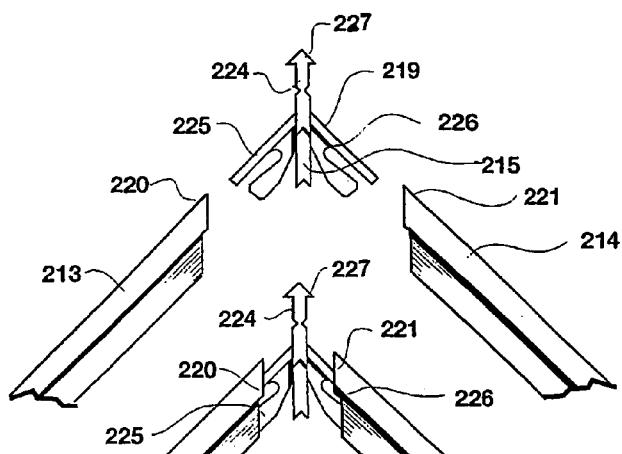
Figure 29A
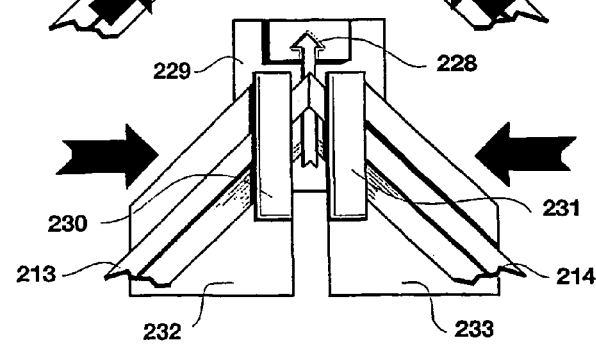
Figure 29B
Figure 29C
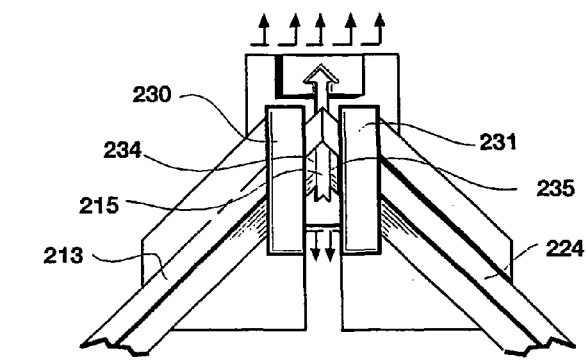
Figure 29D
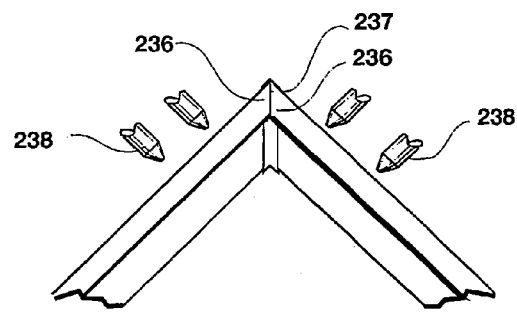
Figure 29E

METHOD AND APPARATUS FOR VIBRATION WELDING OF THERMOPLASTIC COMPONENTS

CROSS REFERENCE TO RELATED APPLICATIONS

This application is a National Phase Application of PCT/CA02/00842 filed on Jun. 7, 2002 claiming priority from Canadian Patent Application No. 2,349,795 filed Jun. 7, 2001.

1. Field of the Invention

This invention relates generally to assembly methods for thermoplastic components and more particularly to methods and apparatus for manufacturing window and door frames using vibration welding techniques.

2. Background of the Invention

At present, plastic window and door frames are typically assembled from polyvinyl chloride (PVC) extruded profiles using hot plate welding technology. Typically, the corner welding process involves pressing the mitered cut ends of two profiles against a Teflon-coated heated metal plate. After the thermoplastic PVC material has melted, the heated metal plate is removed and the two ends are then pressured against each other forming a hermetically sealed welded bond.

Typically, in manufacturing a four sided frame assembly either one-head, two-head or four-head welding equipment is used. For four-head welding equipment, the complete frame is assembled in one operation and, taking into account the time required for frame set-up, profile loading, corner welding, cool down and frame unloading, the total cycle time is about two minutes.

As well as being a comparatively slow process, a further drawback of hot plate welding is that a large quantity of plastic flash is created at the weld line and this plastic flash has to be mechanically removed through a process that can involve cutting, shaving and routing operations. Generally, the equipment required for flash removal is complex and expensive and the process can also damage any surface coatings applied to the extruded profiles. In addition because the plastic flash material is contaminated during the welding process, the removed waste material cannot be recycled and the contaminated material can also effect the final weld strength. Finally to order consistently achieve a square right angled square corner, the equipment incorporates elaborate and complex mechanical support systems.

Vibration welding is one commonly used method for welding together the flat surfaced end walls of two thermoplastic components. As described in U.S. Pat. No. 4,352,711, the typical vibration welding process involves one component being held firmly in place in a stationary bottom fixture while a second component is firmly held in place in a moveable top fixture. By applying pressure and moving the top fixture very rapidly, heat is generated through surface friction, in a very short period of time, that melts the two contact surfaces of components that are to be welded together and thus in addition to a short cycle time, a further key advantage of vibration welding is that minimum flash is generated so that the need for mechanical flash removal can be substantially reduced. Generally, the two plastic component parts are injection molded and this allows for flash dams and other features to be incorporated into the components. As a result, even with the limited flash that is generated, its movement and location is controlled so that it is not visually obtrusive or unsightly.

Various efforts have been made in the past to use vibration welding techniques for plastic frame assembly but without commercial success. In U.S. Pat. No. 5,902,657, issued to Hanson et al, two alternative processes are described that are specifically developed for manufacturing window and door frames. One technique uses an apparatus similar to a conventional hot plate welder where a vibratory metal plate rapidly moves back forth between the ends of two profiles. To create a welded joint, the metal plate is then removed and the two profiles are pressed against each other. As described, there are some technical issues with this process because unlike conventional hot plate welding, only a thin surface layer is heated and as a result, when the vibratory metal plate is moved away, the small amount of surface plastic material that has been melted is either removed and/or rapidly cools down so that when the two profiles are finally pressed together the welded bond formed between the two profiles is poor.

There are also some technical concerns with the second alternative process described in U.S. Pat. No. 5,902,657. With this method for a four-sided frame, two opposite sides are held fixed in position while the other two sides are moveable. The moveable sides are held in fixtures that are connected to four vibratory heads that are located at profile corner ends when directly welding together two hollow thin wall profiles. Because the vibratory head moves back and forth very rapidly, it is very difficult to accurately control the final position of the vibratory head and so consequently the thin profile walls are not correctly aligned and this results in reduced corner weld strength as well as an uneven joint line which is visually noticeable.

With vibration welding, there is typically a minimum zone of disturbance at the weld line. However, for glass fiber re-enforced plastics as described in U.S. Pat. No. 5,874,146 by Kagan et al, higher structural strengths can be achieved with a wide weld zone that allows for some of the glass fibers to orient away from the flow direction and to cross the weld interface.

SUMMARY OF THE INVENTION

The invention provides a method for forming a vibratory welded connection between first and second members and a junction piece where said members and said junction piece are composed at least in part of thermoplastic resin material, said method comprising providing a vibratory head; engaging said junction piece in a fixture connected to said vibratory head; mounting said first and second members in fixtures that are independent of said vibratory head; creating an engagement force between each of said first and second members with a respective opposite side of said junction piece; maintaining said engagement forces while vibrating said junction piece by means of said vibratory head at a frequency of from 50 to 500 Hz to create friction generated heat to melt material on the ends of said members and on each respective opposite side of said junction piece, such melted material upon cooling forming a weld between said junction piece and said members; and where said engagement forces between said first and second framing members and said junction piece are applied separately from the operation of the vibratory head.

Preferably the engagement forces provide even pressure on each side of the junction piece. The engagement forces desirably are varied in the duration of the welding step such that after the desired degree of melting of the materials of the engaging faces has been achieved, each engagement force is reduced to a level wherein the melted material remains molten in position between the ends of the members and the junction piece.

Preferably the junction piece has a planar flange that extends at an angle with respect to each of the members, the junction piece incorporating a removable tab that is an extension of the planar flange. The tab is held in the fixture connected to the vibratory head, and after the welding step has been completed it is removed. The tab preferably has a geometric shape that is held in the fixture in an insert hole with a similar geometric shape, e.g. T-shaped, the junction piece being held firmly in position by means of metal spring attachments or the like. Alternatively, the junction piece can incorporate insert holes for engagement by insert pins on the fixture to secure the junction piece in position.

For a particular application, the vibratory corner welding process is controlled by adjusting the duration of the operation of the vibratory head for a specified amplitude, frequency, and engagement force.

From another aspect the invention provides Apparatus for forming a vibratory welded connection between end faces of first and second frame members and a junction piece, and where said frame members and said junction piece are composed at least in part of a thermoplastic material, said apparatus comprising:

a) a vibratory head including a drive for vibrating said head in a predetermined plane at an amplitude or at least 0.4 mm and at a frequency of from 50 to 500 Hz;
b) opposed first and second fixtures each having clamping structure for securing thereon a respective one of said first and second frame members and where said first and second fixtures support said first and second frame members for movement independently of said vibratory head;
c) a third fixture for holding the junction piece in a balanced way and typically in a central location on said vibratory head, said junction piece having a planar part that is aligned perpendicularly to said predetermined plane;
d) guide structure for guiding relative movement between said frame members and said junction piece in directions parallel to said predetermined plane and perpendicular to said planar part and to said end faces to facilitate engagement between opposite sides of said junction piece and said first and second frame members respectively;
e) pressure actuators coupled to first and second fixtures to provide an engagement force between opposite sides of said junction piece and said first and second members; and
f) a control system to regulate the operation of the vibration corner welding apparatus.

Preferably there are adjustment mechanisms associated with each pressure actuator whereby the engagement force provided by each pressure actuator is independently adjustable. In this way, a variable force of engagement can be provided through the duration of the welding step.

The third fixture which holds the junction piece is preferably located so that the planar flange of the junction piece is balanced and positioned typically in a central location, with the first and second fixtures being movable independently of this third fixture.

The invention also contemplates a system for interconnecting a series of elongate frame members to form a closed frame. In this system adjacent ends of adjoining frame members are engaged by use of the aforesaid apparatus. The frame member can be a rectangular frame, a set of apparatuses aforesaid being provided at each of the four corners of the frame.

The framing members need not be assembled at right angles, but can in fact be connected at any selected angle in the range 90° to 15°. The angles of adjoining frame members with respect to the junction piece can also be different. Nor is it essential that the framing members be straight, but on the contrary, one or more of the framing members may be longitudinally curved.

The system for interconnecting the frame members can be used to assemble those members around an inner panel prior to the frame members being welded together to form a complete assembly with the panel. The panel can be of any desired composition such as a sheet of glass or rigid plastics material, an insulating glazing unit, a multi-cavity sheet extrusion, or the like.

The invention further provides a frame comprising a plurality of elongate frame members, adjacent ends of pairs of said members being interconnected through an interposed junction piece, wherein said frame members and said junction piece are each composed at least in part of a thermoplastic resin, wherein each said junction piece is secured to a pair of adjacent frame members by vibratory welded bonds on opposite sides of said junction piece, and wherein said junction piece has a planar flange that extends at an angle with respect to each said frame member.

Preferably each hollow profile has a peripheral wall that provides a surface for welding to the planar flange. The hollow profile of the frame members can be subdivided into two or more cavities.

Preferably the planar flange has a thickness in the range of 2 mm to 12 mm and preferably 3 mm to 6 mm.

The flat surfaces of the planar flange may incorporate a textured surface finish to improve the build-up of friction generated heat.

The frame members are preferably composed of glass fiber reinforced thermoplastic material, such as polyvinyl chloride. The frame members can have decorative coatings or finishes incorporated on their outer surfaces.

The junction piece may preferably carry integral legs that extend from opposite sides of the planar flange, the legs being sized to engage longitudinally within the hollow interiors of the adjacent frame members. The integral legs of the junction piece may incorporate each an integral spring centering device. Furthermore the hollow frame profile members can be fixed to the legs of the junction pieces by ultrasonic spot welding at locations spaced from the planar flange.

Preferably the ends of the framing profiles are miter cut to provide the desired corner angle of the frame, e.g. a miter cut at 45° to provide a 90° corner. The miter cut ends of the framing profiles may be formed with a so-called dado cut (open sided groove) and a pressure plate can be applied on the miter cut ends of the front face of the framing profile during the welding process to prevent the appearance of this front face being marred by any welding flash.

The junction piece can incorporate devices such as traps, grooves or welding beads for locating or receiving plastic flash generated during the vibratory welding process.

There are three preferred applications for the vibration corner welding process, namely: (i) where frame members are assembled around an insulating glass unit and where silicone sealant is applied in gaps between the assembled frame and the insulating glass unit; (ii) where glazing sheets are directly adhered to the sides of a frame assembly using silicone sealant, and (iii) where an assembled frame is located between spaced glazing sheets.

BRIEF DESCRIPTION OF THE DRAWINGS

The following is a description by way of example of certain embodiments of the present invention, reference being made to the accompanying drawings, in which:

FIGS. 1A and 1B are elevation views of a frame corner assembly fabricated from square profile, glass fiber filled PVC extrusions and welded at the corner using conventional hot plate welding technology.

FIGS. 29A to 29E are details of the production steps involved in the sealed frame corner assembly using a combination of friction welding and ultrasonic spot welding techniques.

DETAILED DESCRIPTION OF THE PREFERRED EMBODIMENTS

Figure 2:
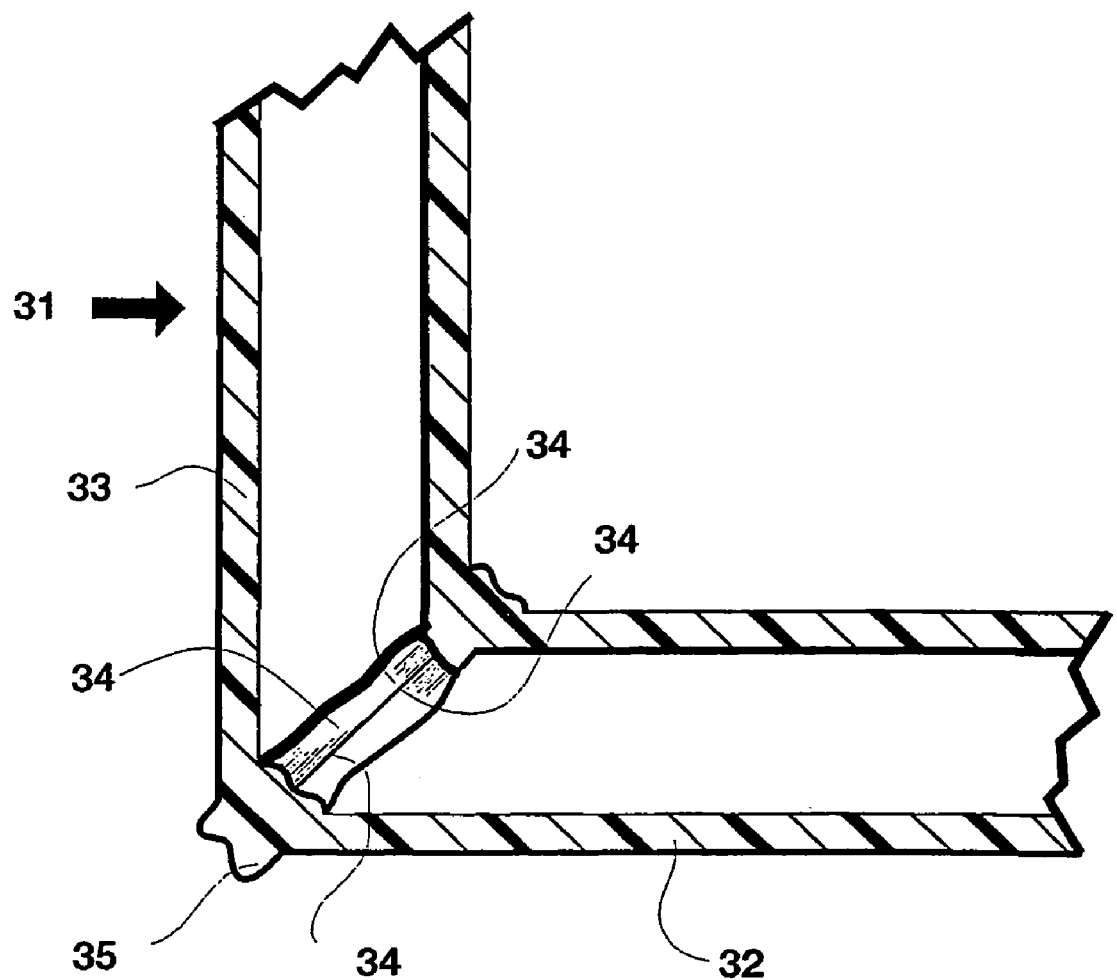
FIG. 2 is a vertical cross section taken on the line 1—1 in FIG. 1 through a corner assembly.

Referring to the drawings FIGS. 1A and 1B show side and front elevations of a frame corner assembly 31 fabricated from square hollow profile, glass fiber filled PVC extrusions 32 and 33. The miter cut corner ends 34 of the frame members 32 and 33 are welded together using conventional hot plate equipment. One major drawback of hot plate welding is that a large quantity of plastic flash 35 is created at the weld line 36. This plastic flash 35 has to be mechanically removed and this process often involves removing a shallow groove at the weld line 36. As a result of this mechanical removal process, the structural performance of the corner weld can be quite significantly reduced.

FIG. 2 shows a vertical cross section on a line 1B—1B through he frame corner assembly 31 where the miter cut ends 34 of the frame members 32 and 33 are welded together at the perimeter wall edge. As previously described this process creates plastic flash 35 that has to be mechanically removed from the profile exterior.

Figure 3:
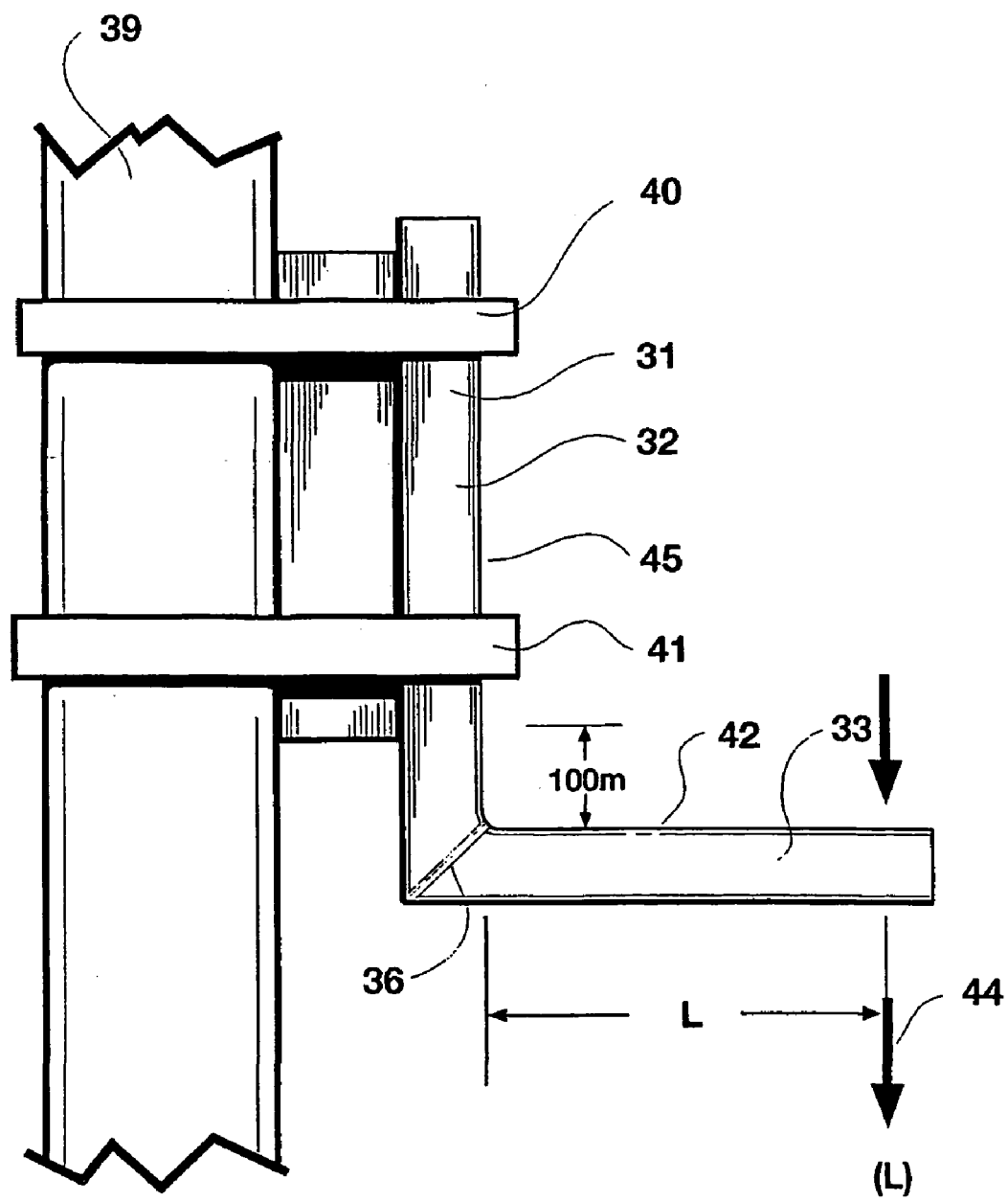
FIG. 3 is an elevation view of the test fixture for the thermoplastic corner test as specified in the North American Fenestration Standard (NAFS-1).

In North America, the structural performance of thermoplastic corner welds are evaluated according to the North American Fenestration Standard (NAFS-1) test procedure. As shown in FIG. 3, the test procedure involves attaching a welded frame corner assembly 31 to a support 39 with clamps 40 and 41. The bottom clamp 41 is located 100 mm above the top edge 42 of the lower frame profile 33. A point load L 44 is gradually applied to the lower frame profile 33 with this load 44 being located at a distance of 360 mm from the front side edge 45 of the upper profile 32. The pass/fail test criterion is that when loaded to failure, the break shall not extend along the entire weld line 36.

Using conventional hot plate welding technology, corner weld test samples as shown in FIG. 2 were fabricated from 30 percent glass fiber filled PVC extrusions. The samples were tested according to NAFS-1 procedure and the samples failed with the break extending fully along the weld line 36. The main reason that the fiber filled material failed the NAFS test procedure is that the weld strength is typically no higher than the base matrix polymer and as a result, because the 30 percent glass fiber filled profiles are stronger and stiffer, the joint is the weak link in the frame assembly.

As described in detail with reference to FIGS. 4–30, one of the main purpose of this invention is to provide a corner frame assembly method where the test samples fabricated from 30 percent glass fiber filled PVC extrusions, consistently pass the NAFS-1 Thermoplastic Corner Weld test procedure.

Figure 4:
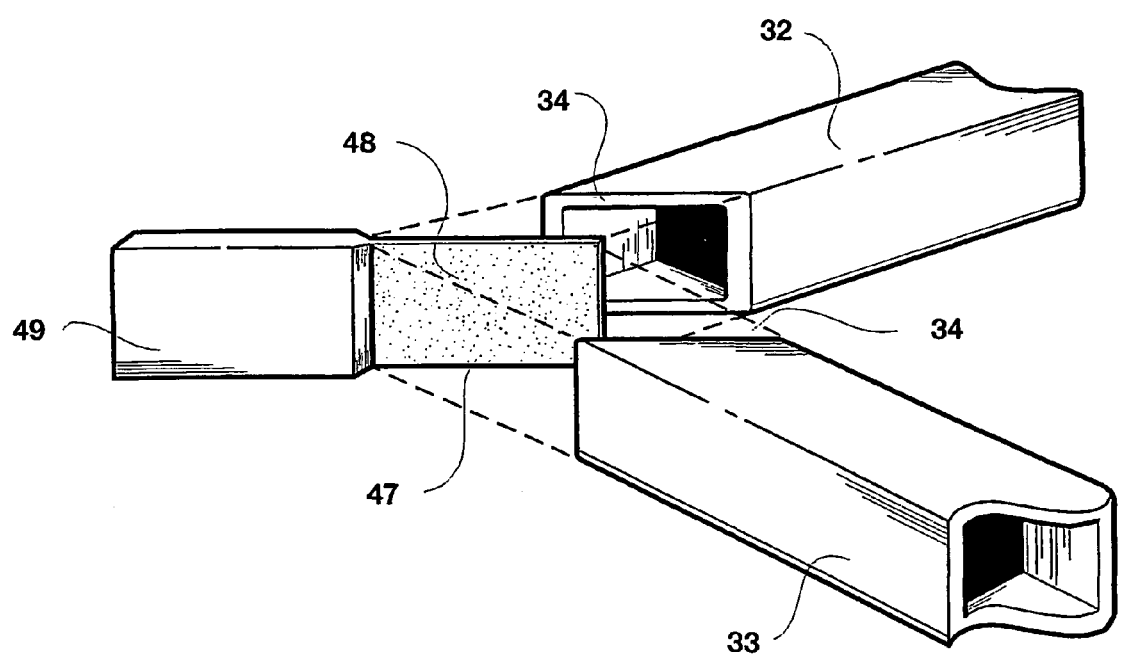
FIG. 4 is an exploded perspective detail of a frame corner assembly incorporating a removable tab on the outer side edge where the thermoplastic extrusions are vibration welded at the corners to a diagonal corner web

FIG. 4 shows an exploded perspective view of corner frame assembly where the miter cut ends 34 of thermoplastic framing member 32 and 33 are vibration welded to opposite sides of a junction piece 47 incorporating a planar flange 48 and a removable tab 49. The junction piece 47 is made from the same base polymer as the thermoplastic framing members 32 and 33. The planar flange 48 incorporates a rough or textured surface and because this surface treatment accelerates the generation of friction heat, the weld cycle time is substantially reduced. The wall thickness of the planar flange 48 can vary between 2 mm to 12 mm with the preferred range being 3 to 5 mm. The removable tab 49 is thicker than the planar flange 48 and this provides for increased strength and stiffness. After the welding process is complete, the removable tab 49 is cut off using a shear press or similar device. Because the vibration welding does not contaminate the plastic weld material, this removable tab can be recycled and the plastic resin reused.

Figure 5:
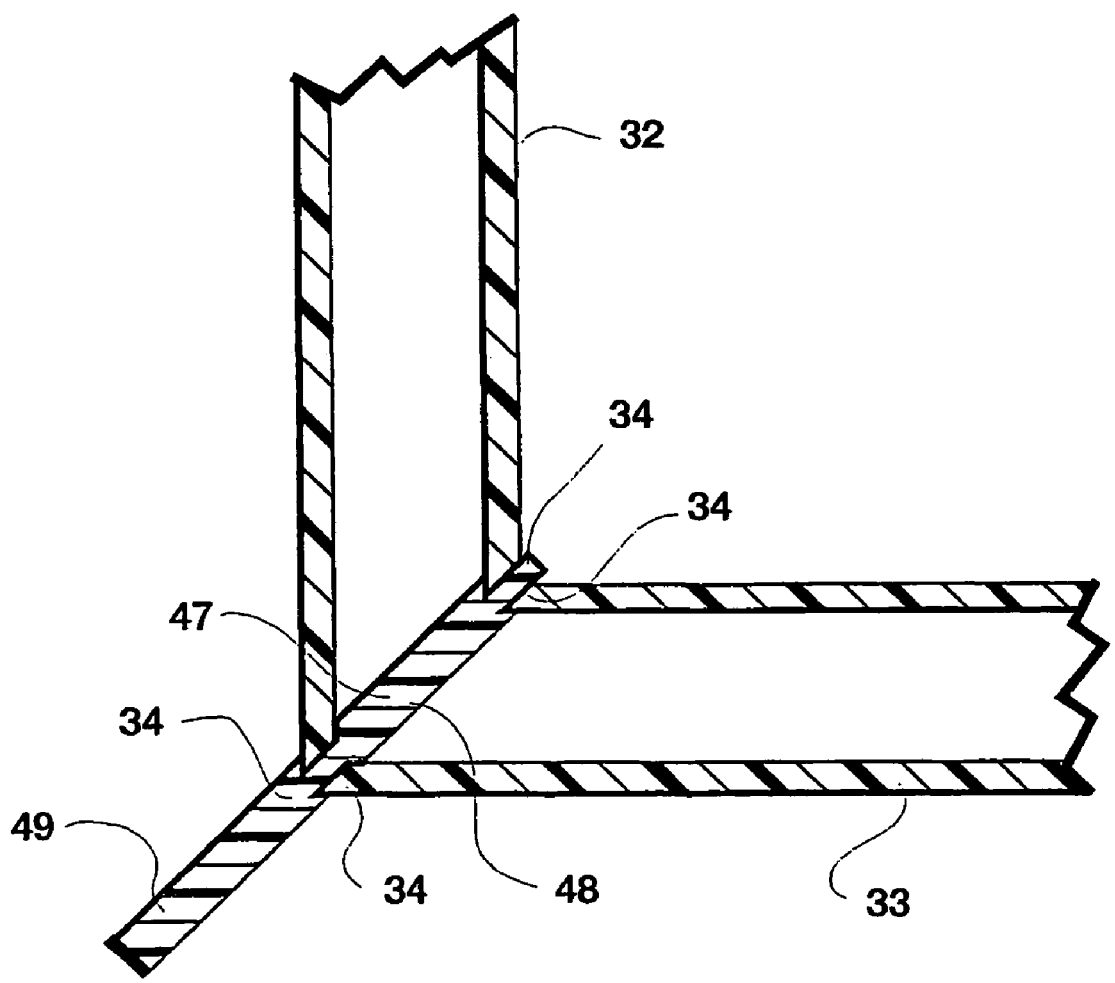
FIG. 5 is a horizontal cross section of a frame corner assembly where the thermoplastic extrusions are vibration welded to a diagonal planar flange junction piece incorporating a removable tab on the outer side edge.

FIG. 5 shows a horizontal cross section through the fabricated corner frame assembly from hollow plastic profiles 32 and 33. Because the framing members 32 and 33 are vibration welded to either side of the junction piece 47, the structural loads at each of the two welds is reduced accordingly. In addition, the planar flange 48 provides for diagonal corner bracing, further increasing the structural performance of the frame assembly.

A removable tab 49 that forms an extension of the planar flange 48 is located on the outer side back of the junction piece 47. During the vibration welding process, this tab 49 is firmly held in a holding fixture 50 linked to the vibratory head 52 of the special vibration welding apparatus 51 as described in FIGS. 6A, 6B and 7A, 7B.

A corner test sample was fabricated using the same hollow square profile PVC extrusions with 30 percent glass content as the samples that had been previously made using conventional hot plate welding equipment. The profile samples were welded to the planar flange using the special vibration welding techniques but unlike the hot plate welded test samples, these vibration welded test samples passed the NAFS-1 Thermoplastic Corner Weld test procedure.

As shown in FIG. 5, the vibration welding process generally results in the plastic framing profiles 32 and 33 being embedded in the planar flange 48. Although it is desirable that the planar flange is made from the same resin-based material as the framing profiles, one option is for the junction piece to be made from a stiffer plastic material (e.g. glass fiber filled material) so that the profiles are not excessively embedded within the planar flange.

Figure 6A:
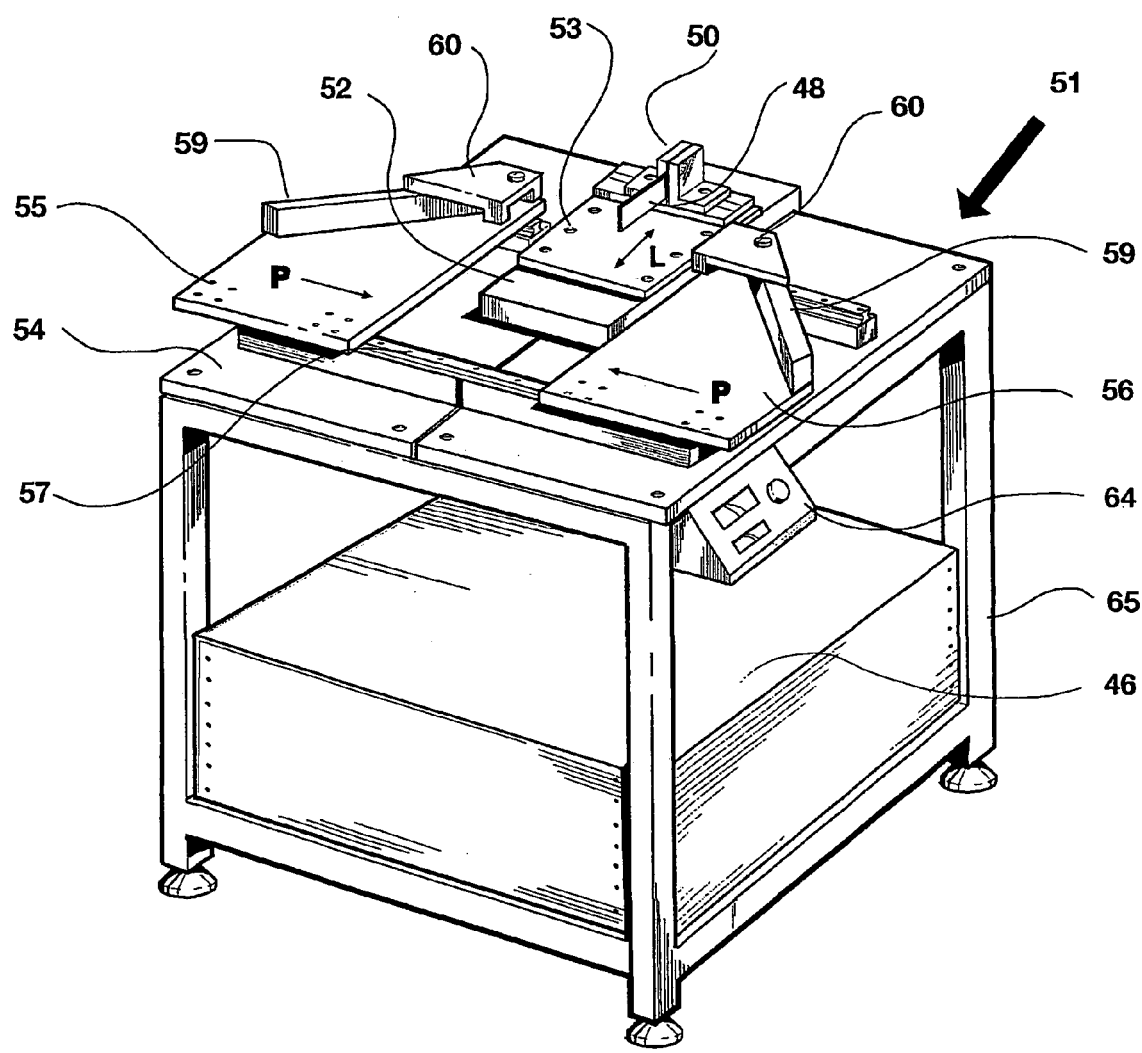
FIG. 6A is a perspective view of a single corner vibration welding apparatus.

FIG. 6A shows a top perspective view of a prototype single corner vibration welding apparatus 51. The apparatus consists of five main components:

1. Vibratory Head

A linear vibratory head 52 that incorporates a top plate 53 which vibrates back and forth very rapidly in a predetermined plane.

2. Junction Piece Holding Fixture

A junction piece holding fixture 50 is directly attached to the top plate 53 and firmly holds the planar flange junction piece 48 in position.

3. Moveable Framing Fixtures

Two moveable framing fixtures 55 and 56 incorporate clamping devices 60 that firmly hold the framing profiles in position. The movement of the framing fixtures 55 and 56 is operated through a variety of means including: electrical servo motors, pneumatic and hydraulic devices.

4. Control Systems

A control system 46 that regulates the various operating parameters of the vibration welding apparatus including: weld time, hold time, joint pressure, amplitude, frequency and voltage. The control system is located in a protective housing and is linked to an operator interface 64.

5. Machine Frame

A machine frame 65 provides the structure that supports the other components.

The vibratory head 53 can move in either a linear or orbital manner. With linear vibration welding, the vibratory head moves back and forth very rapidly in a predetermined plane. While with orbital vibration, the vibratory head continuously rotates in a circular operation. As a continuous process, orbital vibration offers some major advantages including: reduced time, less energy, less weld amplitude, reduced clearance and better flash control. At present, orbital vibration is somewhat less reliable because the continuous circular motion is driven by an electrical motor and so only linear vibration welding is illustrated in the following figures. However, it can be appreciated by those skilled-in-the-art that orbital vibration welding can also be substituted for many of these corner welding applications and specifically, the process offers advantages where a planar flange junction piece is used.

Figure 7A:
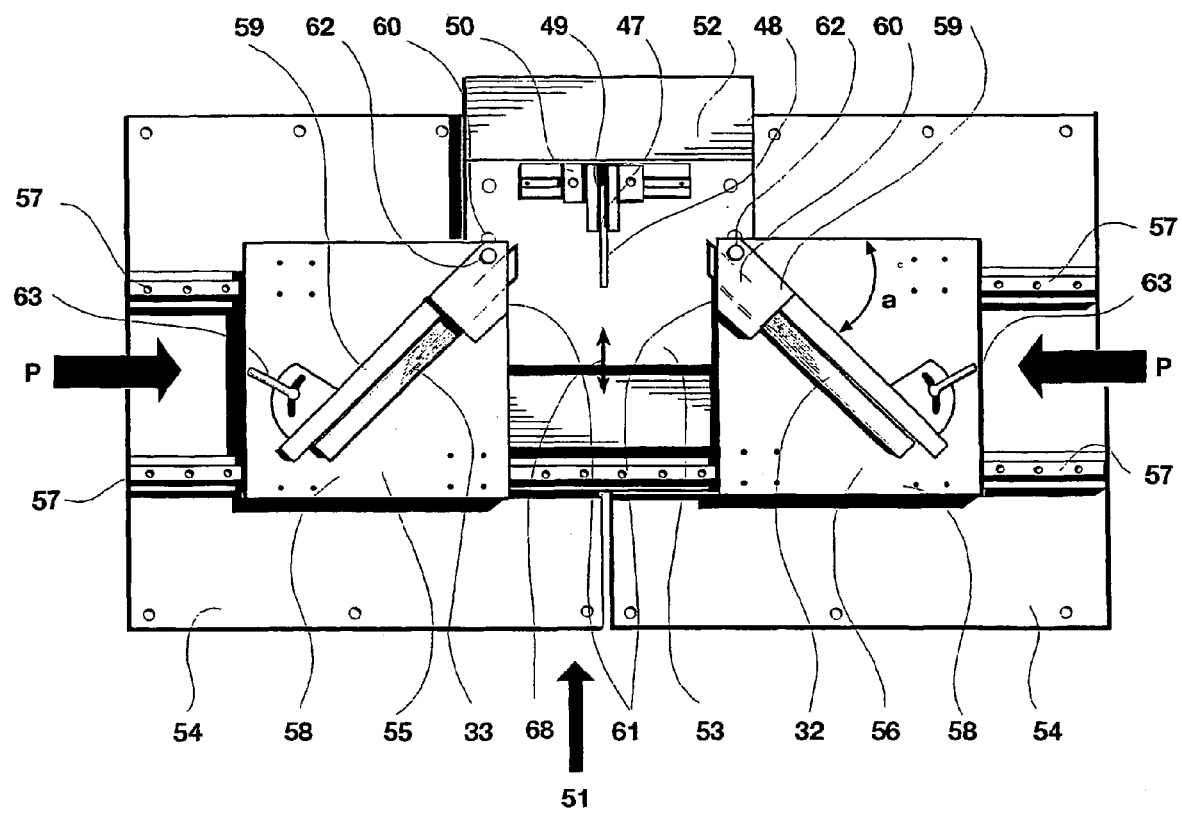
FIG. 7A is a plan view of a single corner, vibration welding apparatus with the extrusions installed in the fixtures prior to the welding process.

FIG. 7A shows a plan view of a single corner, vibration welding apparatus 51 in an open position. The linear vibration welding apparatus 51 features a vibratory head 52 that linearly moves back and forth in a pre-determined plane. The vibratory head 52 is similar to the vibratory heads used on commercially available linear vibration welders such as the Branson Mini Welder, but unlike these commercially available products, the vibratory head is turned upside down as this allows for more flexible and easy positioning of the framing members 32 and 33 during the frame assembly process. A flat plate 53 is bolted to the top surface of the vibratory head 52. As with standard vibration welders, the vibratory head is bolted to a separate heavy cast iron support (not shown) and isolated from the cast iron support structure (not shown) using rubber mounts. This cast iron support structure is in turn bolted to a machine frame 65 that positions the vibratory head 52 at a convenient working height.

Flat plate metal sheets 54 are bolted to the top surface of the machine frame 65 but this top working surface is separated apart from the vibratory head 52 so that a minimum of vibratory movement is transferred to the machine frame 65. Moveable profile fixtures 55 and 56 are supported on guide rails 57 directly attached to the top table plate 54 and these fixtures hold the framing profiles extrusions 32 and 33 in position. The moveable profile fixtures 55 and 56 move over the vibratory head 52 but there is no direct contact except where the framing profiles 32 and 33 contact the junction piece 47. The moveable fixtures also allow for the miter cut ends 34 of the framing profiles 32 and 33 to be positioned parallel to the planar flange 48 of the junction piece 47.

Each moveable profile fixture 55 and 56 consists of a horizontal flat plate 58, a support member 59 that is attached to the horizontal plate 58 and a clamping fixture 60 that firmly holds the profiles 32 and 33 against the support member 59. A front clamp 60 is positioned adjacent to the side edge 61 of the flat plate 58 and to ensure that the profile 33 is firmly held in position, the miter cut profiles 32 and 33 only extend 2 or 3 mm beyond the side edge 61. It is also important that both the profiles extend the same distance from the two clamping fixtures.

To provide for a right angled joint connection (i.e. 90°), the vertical support members 59 are positioned at a 45° angle to side edge 61. However for special framing shapes, the angular position a of the support member 59 can be adjusted as required by means of a pivot point 62 and an attachment device 63. A fixed holding fixture 50 for the junction piece 47 is located so that the planar flange of the junction piece is in a balanced central position. The holding fixture 50 which is directly attached to the top plate 53 of the vibratory head 52, firmly holds the removable tab 49 of the junction piece 47 in position.

Figure 7B:
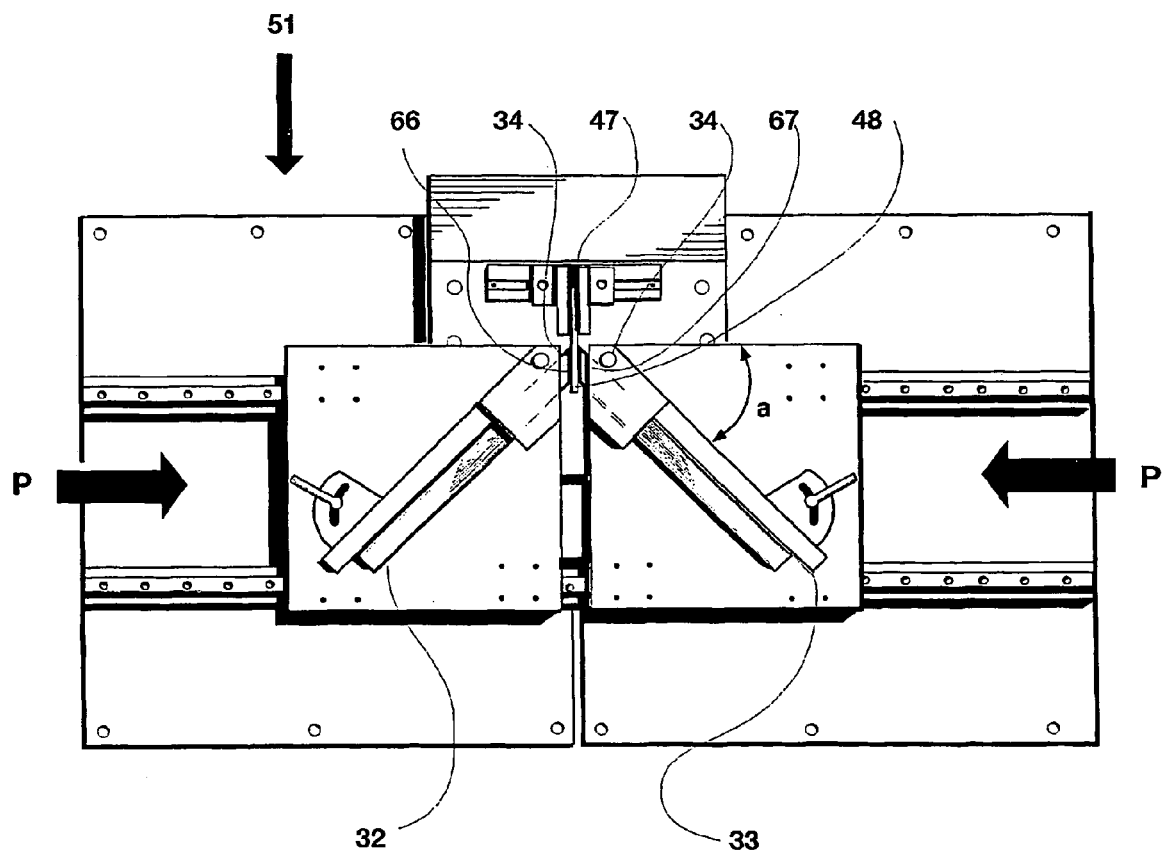
FIG. 7B is a view similar to FIG. 7A showing the single corner vibration welding apparatus during the welding process.

FIG. 7B shows a plan view of the vibration welding equipment in operation. The miter cut ends 34 of the profile extrusions 32 and 33 are pressured against the planar flange 48 of the junction piece 47. As required, the angular displacement of the profile fixtures 55 and 56 can be adjusted so that all four joint surfaces are parallel with each other.

In operation, friction heat is generated at the two joint interfaces between the parallel surfaces of the miter cut ends 34 of the framing profiles 32 and 33 and the planar flange 48 of the junction piece 47. By vibrating the junction piece 47 back and forth and by simultaneously pressuring the framing profiles 31 and 32 against the planar flange 48 of the junction piece 47, friction heat is generated at the two joint interfaces. When a molten state is reached at the two joint interfaces 66 and 67, the vibration is stopped and the perpendicular pressure P is then maintained briefly while the molten plastic solidifies to form two welded joints 66 and 67 on either side of the planar flange 48. In order to provide for even weld strength, essentially the same perpendicular engagement force has to be simultaneously applied to each side of the junction piece 47

In the vibration welding process, if excessive pressure is applied after the surface plastic has been melted, the melted plastic can be pushed away from the joint line resulting in a poor structural bond. By carefully controlling the engagement force or pressure of the framing profiles on the junction piece, this joint bond problem can be avoided. After the desired degree of melting of the materials at the joint line has been achieved, the engagement force is reduced to a level where the melted material remains molten in position between the ends of the framing profiles.

In friction welding glass fiber filled profiles, one of the reasons for reduced weld strength is that the glass fibers align along the weld line, perpendicular to the applied engagement force or pressure. This weld zone is typically very narrow varying from 40 to 100 microns. By carefully controlling and optimizing the welding parameters and particularly the applied pressure, a wide weld zone can be created so that some of the glass fibers are oriented away from the weld line and cross the weld interface. As a result, higher weld strengths can be achieved for the glass-fiber filled profiles.

Using the prototype corner welding apparatus, a series of experiments have been carried out and these experiments have shown that satisfactory structural welds can be achieved by optimizing the different welding parameters through quite a wide range of different parameter values. For example, maximum applied pressure can be reduced if amplitude is increased, or both maximum applied pressure and amplitude can be reduced if weld-time is increased. Particularly to reduce the amount of plastic flash that is produced, our experiments have also shown that is preferable to use a higher frequency and a lower amplitude. Generally, the different welding parameters can be varied through the following values although for each application, there is a need to establish a particular set of welding parameters.

| | |
|---|---|
| Maximum applied pressure | 6 kN |
| Weld time | 2–12 seconds |
| Weld amplitude | 0.4 mm to 3 mm |
| Weld frequency | 50 to 500 Hz |

Generally for a particular application, the vibratory corner welding process is controlled by the weld time that is determined for a specified weld amplitude, frequency and maximum applied pressure or engagement force. It should be noted that weld time is defined as the duration of the operation of the vibratory head.

Figure 6B:
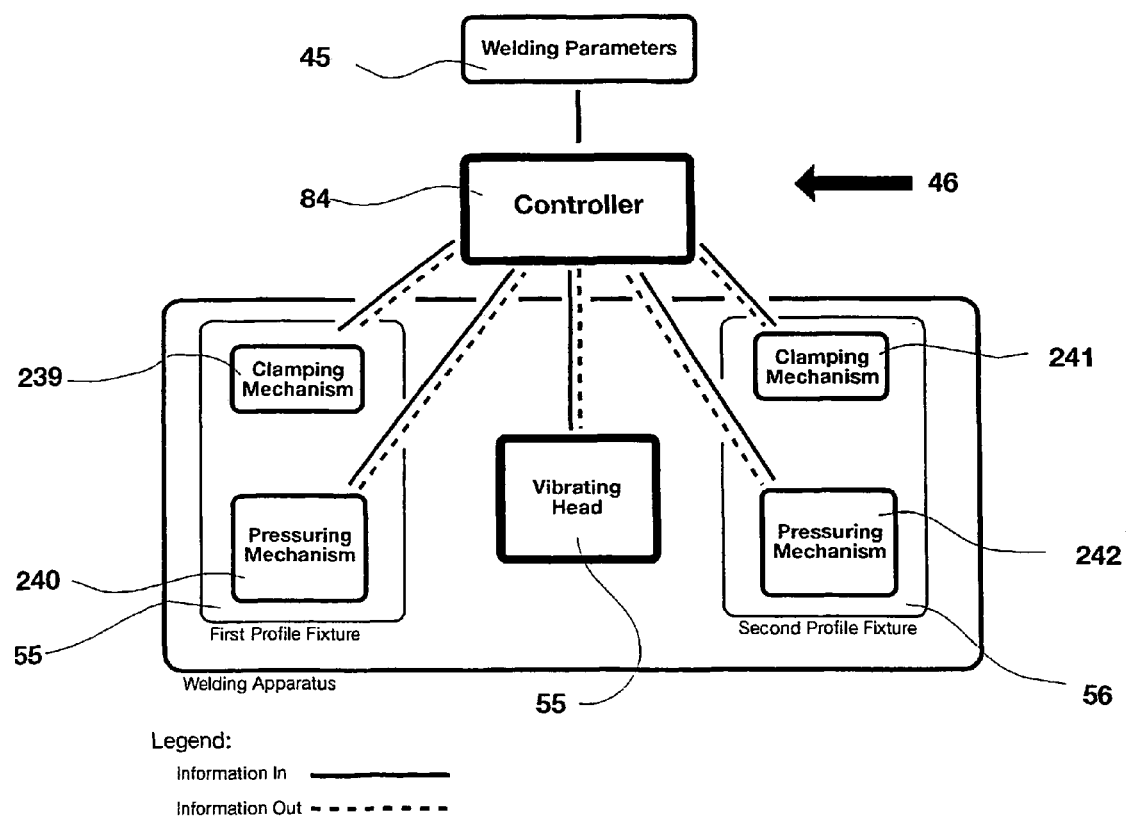
FIG. 6B is a schematic diagram of the control system for a single corner friction welding apparatus.

FIG. 6B is a schematic diagram of the control system 46 for the single corner vibration welding apparatus 51. The control system 46 consists of a central controller 84 which is protected within metal housing and linked to an operating interface 45. The controller 84 controls the operation of five main components: (i) vibratory head 55, (ii) clamping mechanism 239 and (iii) pressuring mechanism 240 of the first moveable profile fixture 55 and (iv) the clamping mechanism 241 and (v) pressuring mechanism 242 of the second moveable profile fixture 56. Through an input/output information feed, the operations of these five components can be coordinated and controlled.

Using the prototype single corner vibration corner equipment as described in FIGS. 6A, 6B, 7A and 7B, corner frame profile assemblies have been successfully produced from a wide variety of different plastic materials, including: polyvinyl chloride (PVC); composite glass fiber filled PVC; cellular foam PVC; composite wood fiber filled PVC and thermoplastic pultrusions. For all assemblies, it is desirable that the planar flange junction piece is made from essentially the same base resin as the framing profiles. A series of alternative designs for the corner web have also been tested and our experiments have shown that satisfactory welds can be produced even with a planar flange thickness of less than 1.5 mm.

Figures 8A, 8B:
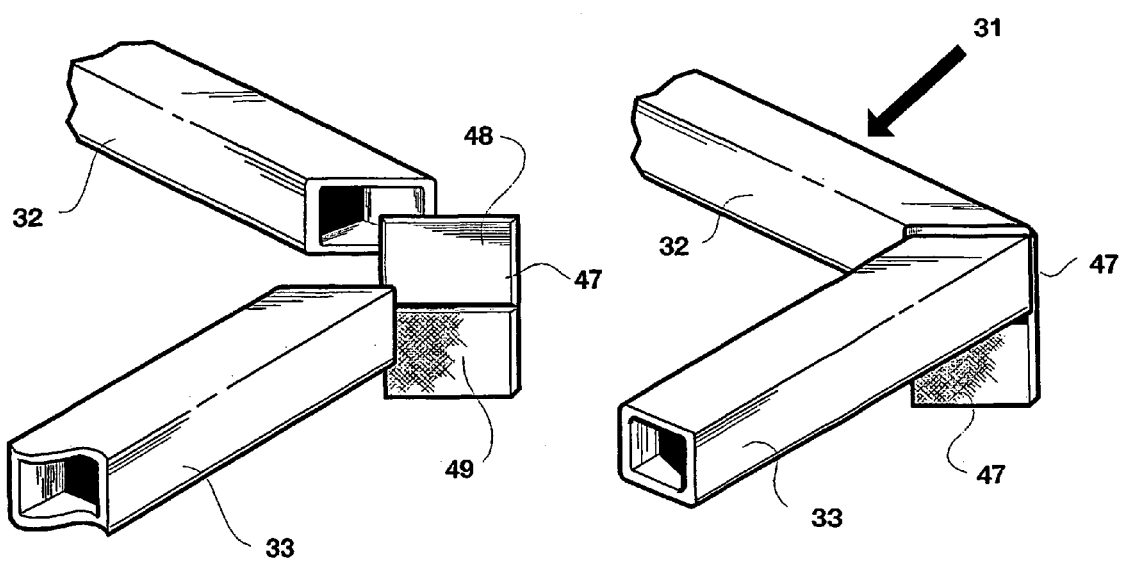
FIG. 8A is an exploded perspective view and FIG. 8B is a perspective view of a vibration welded corner frame assembly incorporating a junction piece with a planar flange and a removable tab on the bottom edge.

FIGS. 8A and 8B show an exploded perspective view of a vibration welded corner frame assembly 31 incorporating a junction piece 47 with a planar flange 48 incorporating a removable tab 49 on the bottom edge. In contrast to the side held junction piece, one advantage of the tab on the bottom edge is that the junction pieces are easier to load into the holding fixture.

Figure 9A:
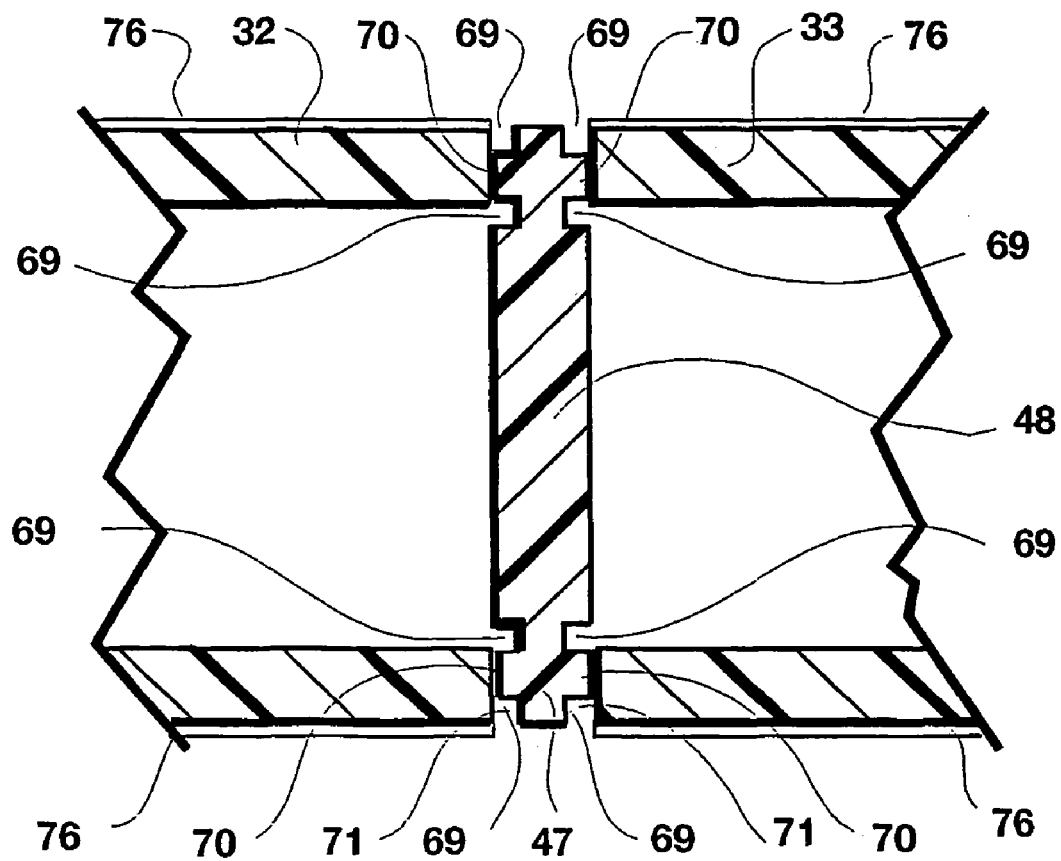
FIG. 9A is a cross section detail of a planar flange web incorporating flash traps.
Figure 9B:
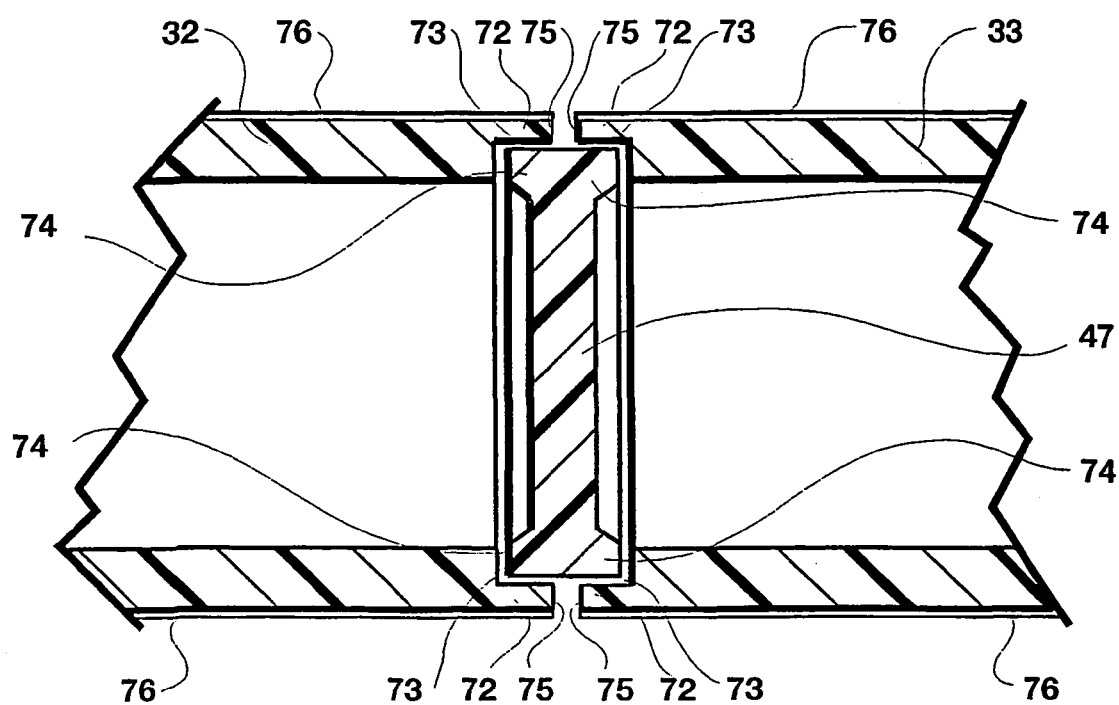
FIG. 9B is a cross section detail of a planar flange web incorporating welding beads.

For simple corner web designs, the junction pieces can be die cut from plastic sheet material. Alternatively, the junction pieces can be injected molded and this has the advantage that various design features can be incorporated into the junction piece that essentially eliminate the need for plastic flash removal. FIGS. 9A and 9B show two alternative joint designs that essentially eliminate the need for mechanical flash removal. In FIG. 9A, two hollow-thermoplastic profiles 32 and 33 are longitudinally joined together using a junction piece 47 incorporating a planar flange 48. The junction piece 47 incorporates flash traps or melt recesses 69 on either side of a central bead 70.

During the vibration welding process, plastic flows into the flash traps 69 creating double parting lines 71.

As shown in FIG. 9B, where the aesthetic requirements are more demanding, the plastic profiles ends 72 can incorporate a dato cut 73. The flat cut ends 75 of the profiles 32 and 33 overlap the planar flange 48 that incorporates welding beads 74. During the vibration welding process, plastic flows inwards around the ends of the junction piece 47 and the two flat cut ends 75 almost touch, creating a single thin parting line. As previously noted, the main advantages of using flash traps and welding beads is that the plastic flash is contained during the welding process and does not have to be mechanically removed from the surface of the plastic extrusions. As a result, it is feasible for decorative surface finishes 76 to be incorporated on the plastic extrusions 32 and 33 because there is no mechanical flash removal, these surface finishes 76 are not damaged during the welding process. A further advantage of weld beads and flash traps is that by not having to remove melted plastic flash material, joint weld strength can also be increased. Although as shown in FIG. 9B, a dato cut is incorporated into the framing profile, it can be appreciated by those skilled-in-the-art, that welding beads can be incorporated into the joint design without the need for dato cuts.

For the vibration welding equipment shown in FIGS. 6A, 6B and 7A, 7B, the framing profiles are held firmly in position by means of a front clamp 60. For more complex profile shapes, special custom fixtures have to be used and where there is a need for different framing profiles to be welded on the same production line, it is necessary for these custom clamps to be changed over. As a result, there can be production slow downs and delays which means that the productivity advantages of vibration corner welding may not be realized.

Figure 10:
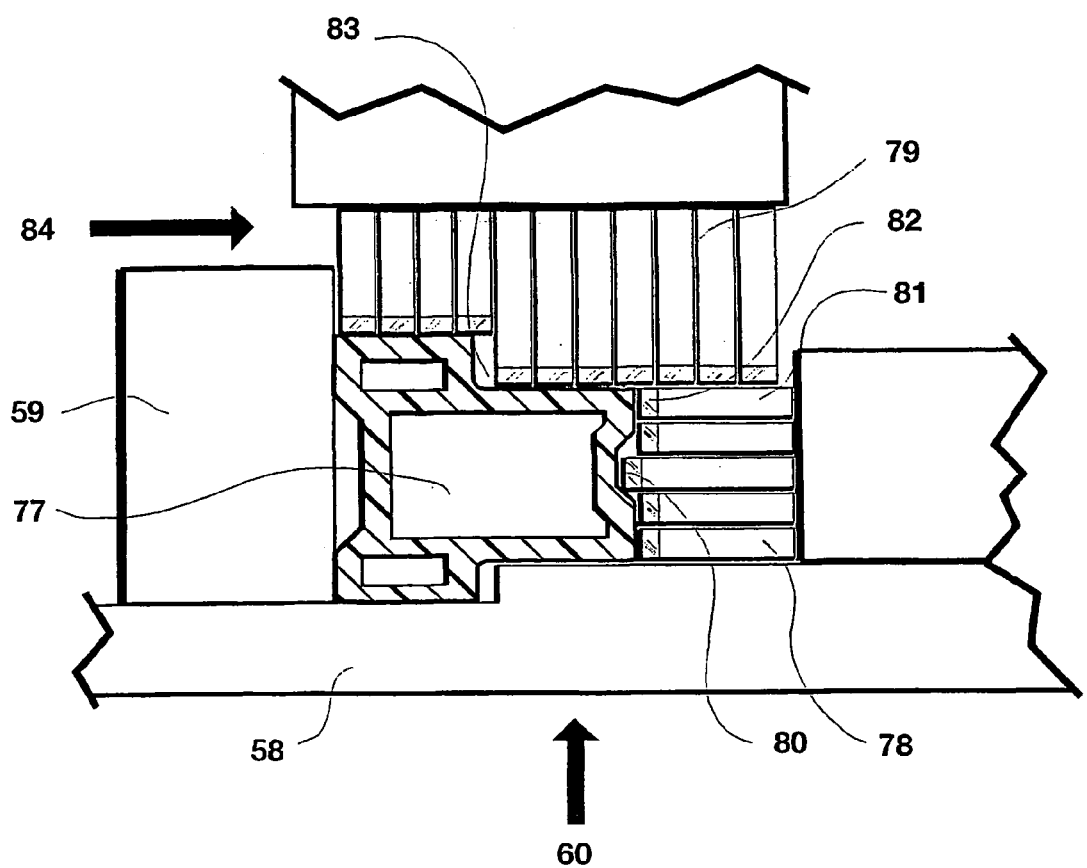
FIG. 10 is a cross section detail of the moveable fixtures that hold the framing profiles in position during the vibration welding process.

To eliminate this need for special custom fixtures, FIG. 10 shows a cross section detail of an adjustable clamp 60 for holding the plastic framing profile 77 firmly in position. A vertical support member 59 is attached to the moveable horizontal plate 58. The framing profile 77 is held firmly in position by means of a double set of flat metal strips 78 and 79 with each strip 81 incorporating a special gripping tip 82. The first set of strips 78 slide into position and assume the general profile shape of the front face 80 of the framing profile 77 so that the profile 77 is held against the vertical support member 59. The second set of flat strips 79 then slide into position and assume the general profile shape of the side face 83 of the framing profile 77 so that the framing profile 77 is held also against the horizontal plate 58. Each set of strips incorporate a locking system (not shown) that locks the strips into position.

Figure 11:
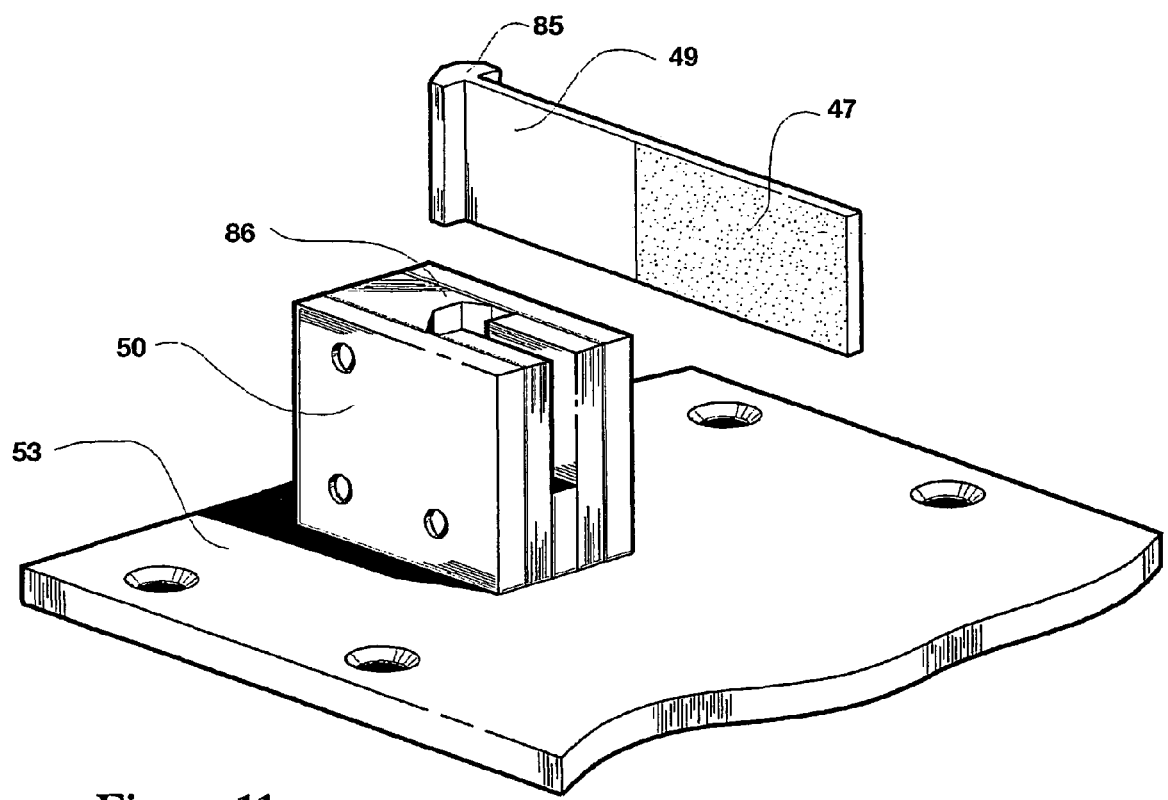
FIG. 11 is a perspective view of a junction piece with a planar flange and a removable T-shaped tab on the outer side edge.

FIG. 11 shows a perspective detail of the junction piece holding fixture 50 for the single corner vibration welding equipment 51. The junction piece holding fixture 50 is mechanically attached to the top plate 53 of the vibratory head 52 (not shown). Because the junction piece holding fixture 50 is vibrated back and forth very rapidly, the stresses or shock level on the fixture are very high and it has been estimated that these stresses are in excess of 100 G-forces. As a result, mechanical pressure devices to hold the corner key in position are not suitable as these pressure devices can not withstand the continual vibration.

As shown in FIG. 11, one way of eliminating mechanical pressure devices is for the removable tab 49 of the junction piece 47 to incorporate a T-shaped profile 85 and for the holding fixture 50 to also incorporate a complementary T-shaped insert hole 86. The junction piece 47 is slid into position and the T-shaped profile 85 is held firmly in position by means of metal spring attachments (not shown).

FIG. 12 illustrates an alternative corner key holding system that also incorporates no moving parts.

Figure 12A:
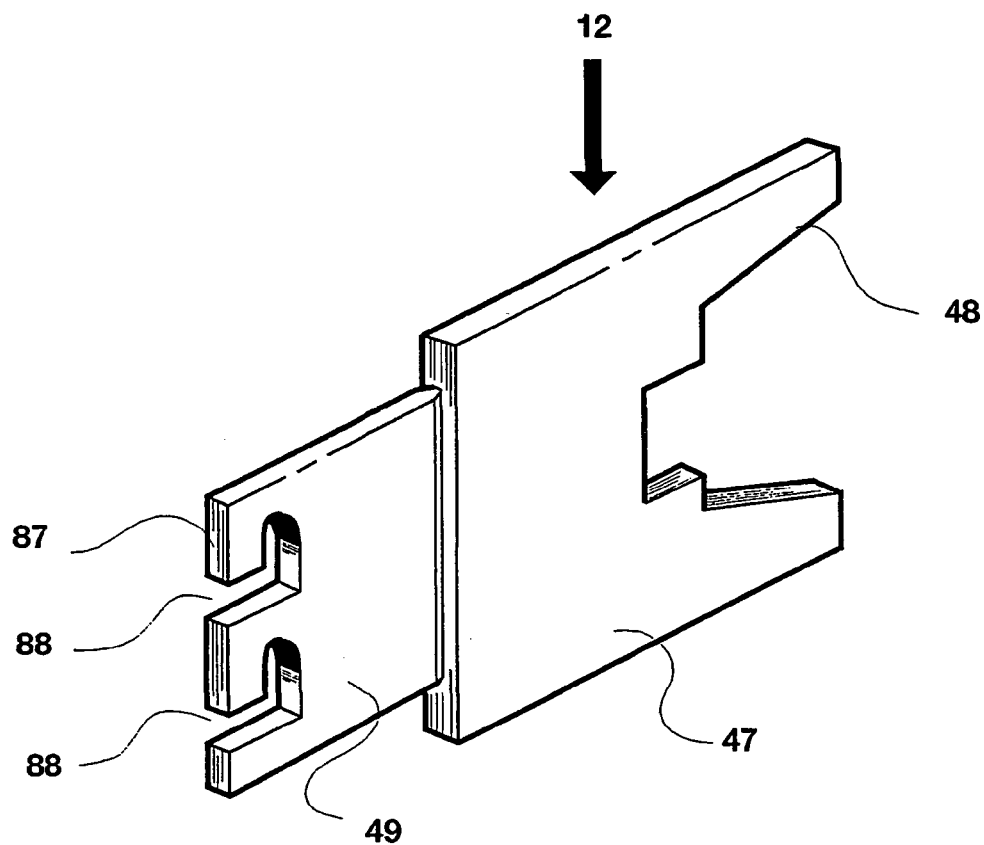
FIG. 12A is a perspective detail of a junction piece with a planar flange and incorporating a removable tab with a double set of L-shaped slots on the back edge.

FIG. 12A shows a perspective detail of junction piece 47 incorporate a planar flange 48 and a removable tab 49. The back edge 87 of the removable tab 49 incorporates a double set of L-shaped slots 88.

Figure 12B:
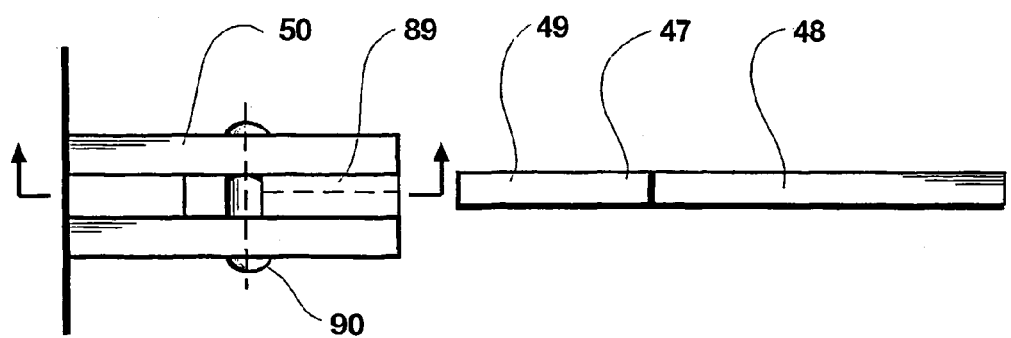
FIG. 12B is an exploded top elevation view of a junction piece holding fixture and a planar flange junction piece web as shown in FIG. 12A.

FIG. 12B shows a top view of a junction piece holding fixture 50 and a planar flange junction piece 47 prior to installation of the junction piece within the holding fixture. The junction piece holding fixture 50 incorporates a narrow slot 89 and the width of this slot 89 is marginally larger than the width of the removable tab 49. Two circular metal pegs 90 span across the narrow slot 89.

Figure 12C:
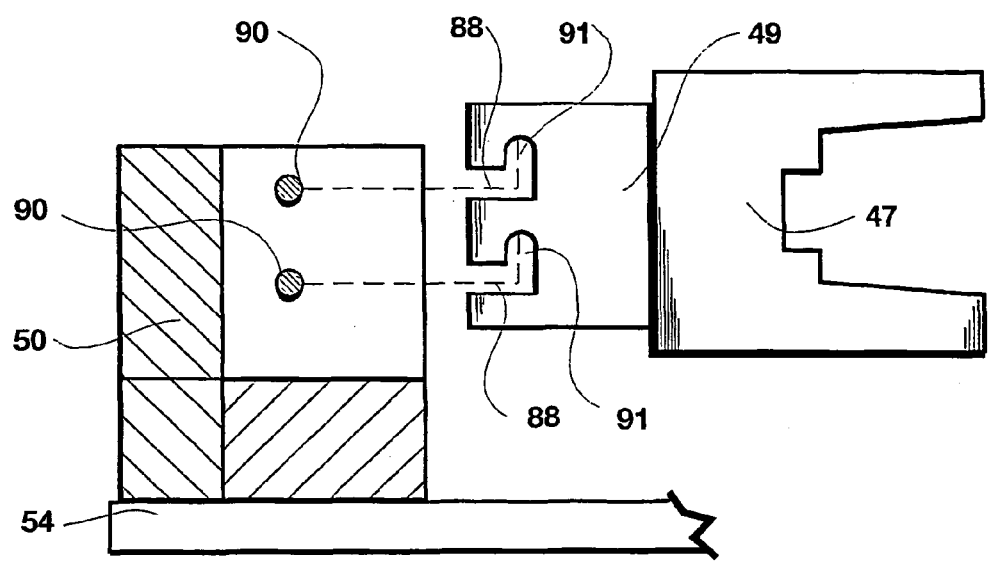
FIG. 12C is a vertical cross section of the junction piece holding fixture with a planar flange junction piece as shown in FIG. 12B.

FIG. 12C shows a cross section view of the junction piece holding fixture 50 prior to installation of the junction piece. In the corner frame assembly process, the junction piece 47 is first moved horizontally across so that the two circular pegs 90 are engaged within the double set of L-shaped slots 88. The junction piece is then dropped down into its final position where the circular pegs 90 are contained within the circular shaped toe 91 of the L-shaped slots 88. Compared to the T-shaped junction piece shown in FIG. 11, the main advantage of the double L-shaped slots is that the junction pieces use less material and so can be manufactured at a lower cost.

Figure 13:
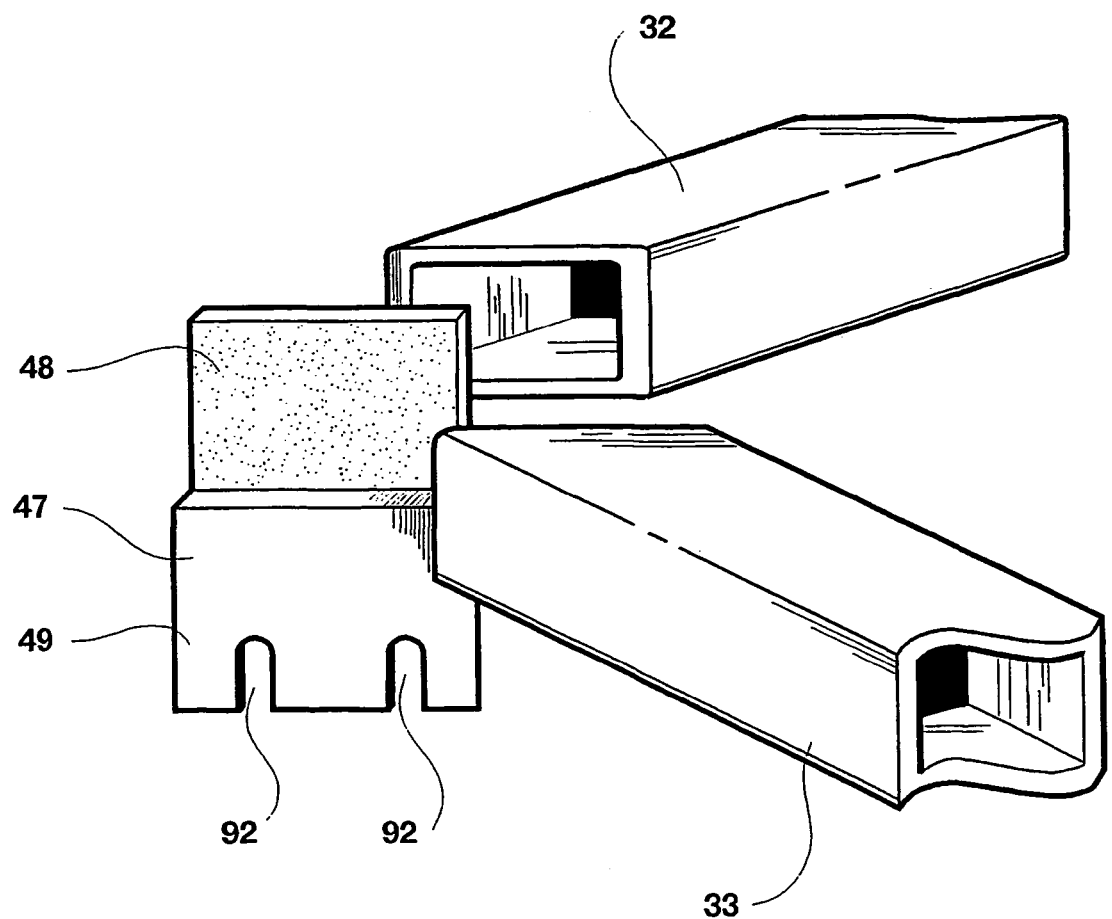
FIG. 13 is a perspective view of a corner web with a removable tab on the bottom edge.

FIG. 13 shows an exploded perspective view of a junction piece 47 with a planar flange 48 and a removable tab 49 on the bottom edge. The removable tab 49 incorporates double vertical slots 92 that correspond to double circular pegs incorporated into junction piece fixture (not shown). Compared to the side held holding system shown in FIG. 12, the main advantage is that the junction pieces are easier to load into the bottom held holding system.

Figure 30:
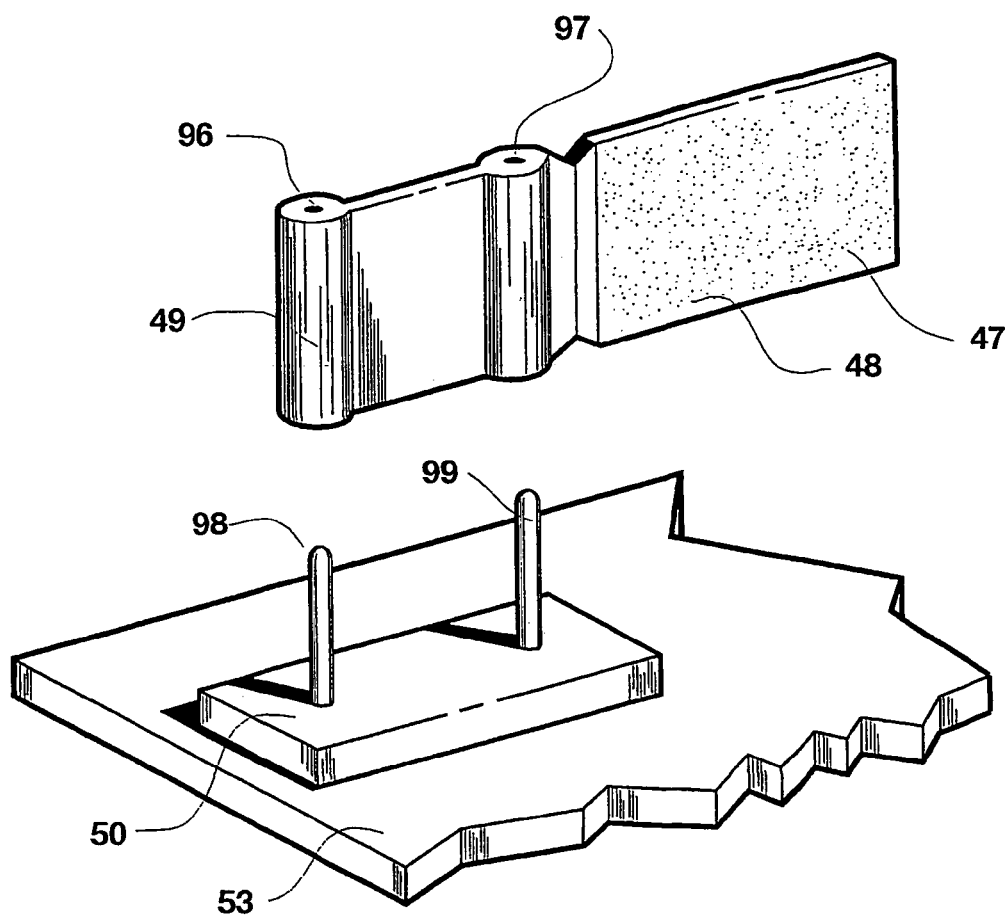
FIG. 30 is a perspective view of a junction piece with a removable tab incorporating insert holes for engagement by insert pins that form part of the junction piece holding fixture.

FIG. 30 shows a second alternative junction piece holding system that also incorporates no moving parts. The junction piece 47 incorporates a planar flange 48 and a removable tab 49. Two insert holes 96 and 97 are incorporated into the removable tab 49 of the junction piece 47. Complementary insert pins 98 and 99 are incorporated into junction piece holding fixture 50 that is attached to the top plate 53 of the vibratory head. When the two pins 98 and 99 are inserted into the two holes 96 and 97, the junction piece is held firmly in position during the vibration welding process.

Rather than incorporating flash traps and welding beads, an alternative method for controlling plastic flash as shown in FIG. 14 is to apply a pressure strip device to the weld joint during the vibration welding process.

Figure 14A:
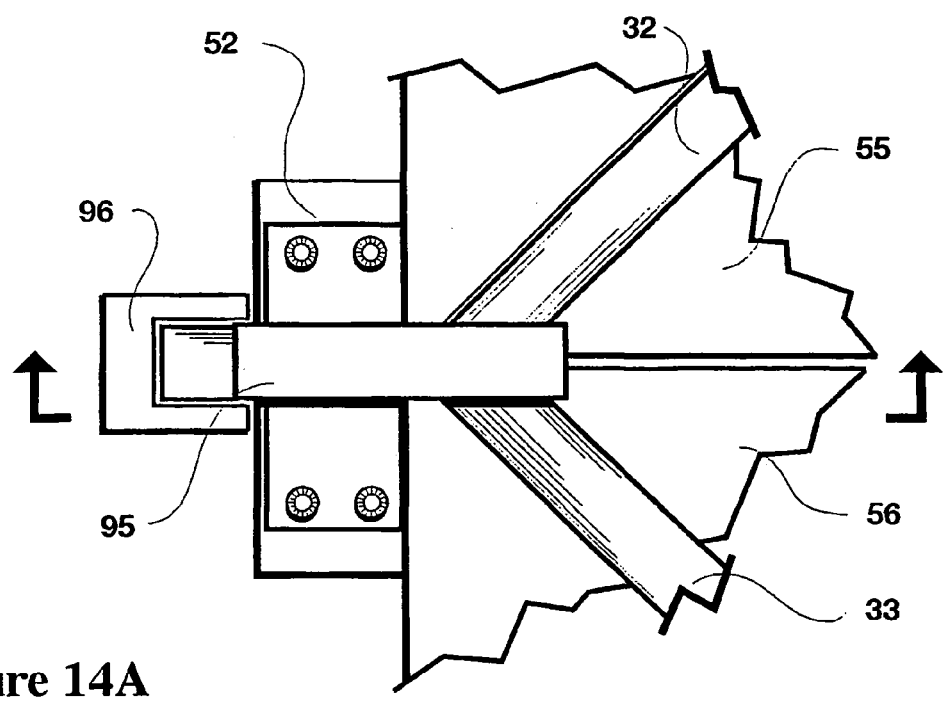
FIG. 14A is a top plan view of a junction piece fixture incorporating a separate pressure strip device.

FIG. 14A shows a top plan detail of the corner web fixture incorporating a separate pressure strip device 95 featuring a non-stick coating such as Teflon on the contact surface of the pressure strip 95. The profile extrusions 32 and 33 are held in position by the moveable framing fixtures 55 and 56. A pressure strip device 95 is attached to a separate support structure 96 and this support structure is isolated from the, vibratory head 52.

Figure 14B:
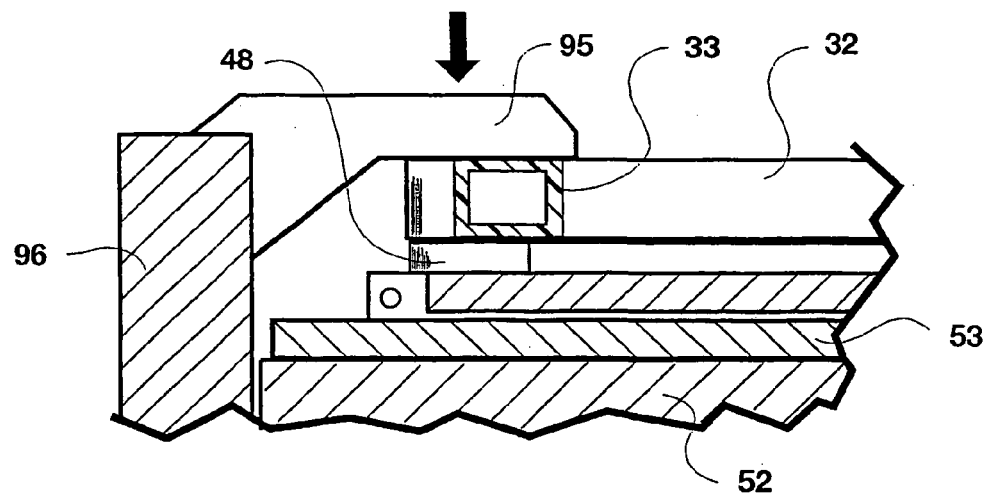
FIG. 14B is a vertical cross section detail of a corner web fixture incorporating a separate pressure strip device.

FIG. 14B shows a vertical cross section detail of the single corner vibration welding equipment 51 incorporating a separate pressure strip device 95 and a bottom-held planar flange junction piece 48. During the vibration welding process, downward pressure is directed on the weld line between the framing profiles 32 and 33 and as a result, the plastic flow generated during the welding process is directed inwards and away from the weld line between the two profiles.

As shown in previous figures, the junction piece 47 consists of a planar flange 48 with a removable tab 49. For certain framing applications, this planar flange configuration does not provide for sufficient structural support and there is a need for additional corner re-enforcement. As shown in FIG. 15, this can be achieved by the junction piece or corner key 100 incorporating integral legs 101.

Figure 15A:
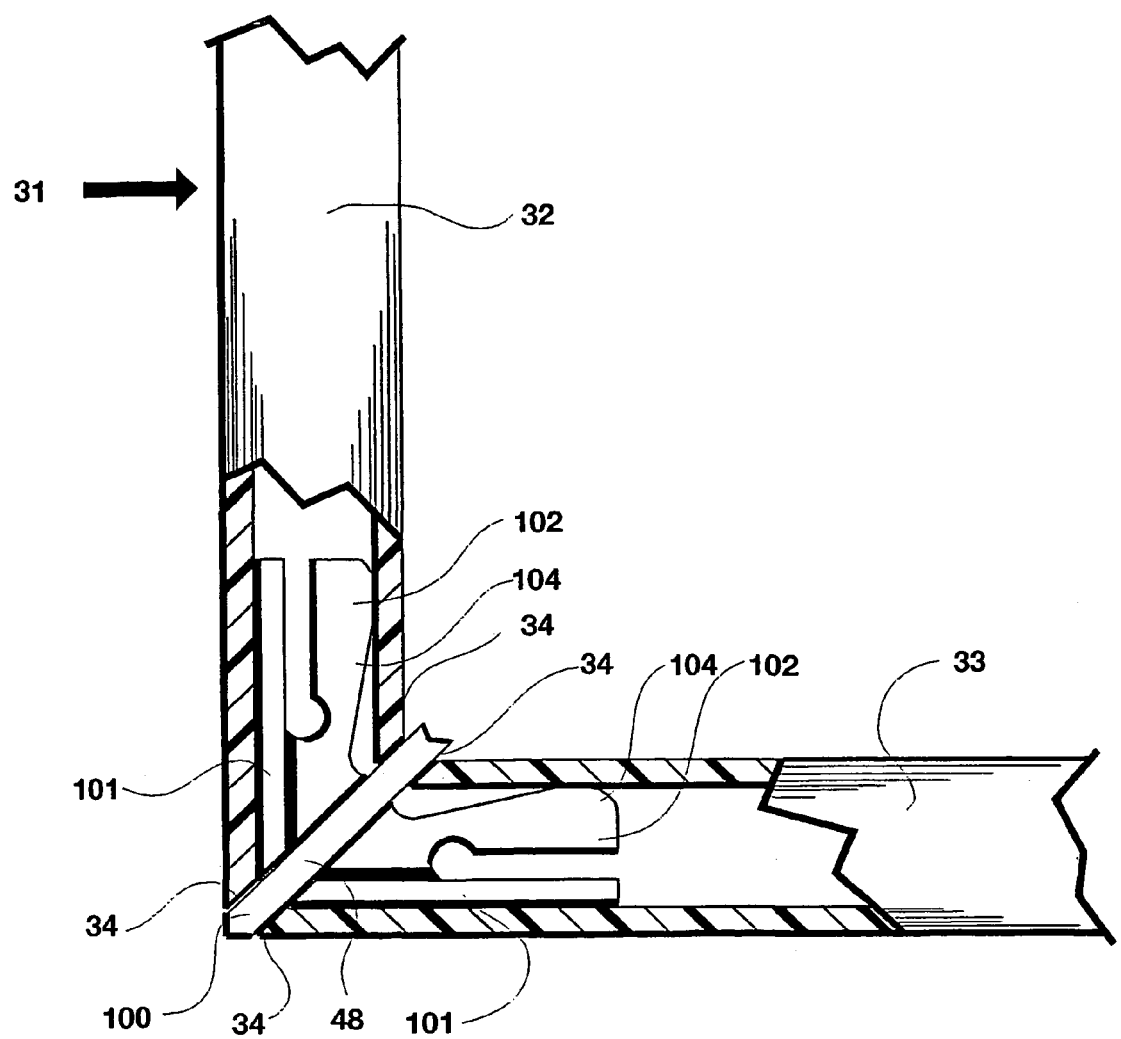
FIG. 15A is a cross section plan view detail of a frame corner assembly where the thermoplastic plastic extrusions are vibration welded at the corner using a corner key with a diagonal web and integral legs.
Figure 15B:
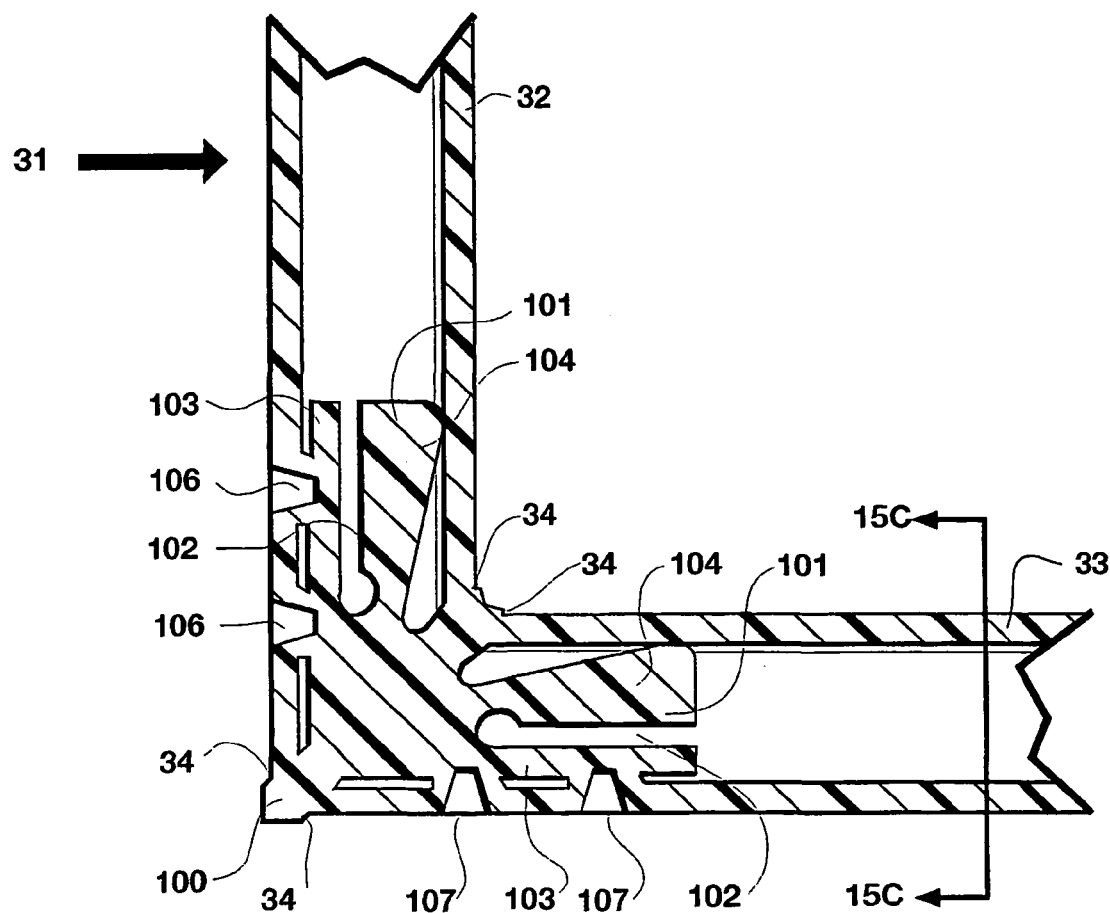
FIG. 15B is a cross section detail of the frame corner assembly as shown in FIG. 15A where the plastic framing profile is ultrasonically spot welded to the integral legs of the corner key.

FIGS. 15A and 15B show a cut out cross section plan view of a corner frame assembly 31 fabricated from square profile glass fiber filled PVC profile extrusions 32 and 33 and where the profiles 32 and 33 are welded at using a junction piece or L-shaped corner key 100 incorporating integral legs 101.

As shown in FIG. 15A, the integral legs 101 of the corner key 100 incorporates an integral spring centering device 102 that simplifies frame assembly. The planar flange 48 of the corner key 100 is first vibration welded to 15 the miter cut ends of the profiles 32 and 33. Because of the need to accommodate the vibration movement back and forth, the legs 101 only loosely fit within the profile.

As shown in FIG. 15B in order to provide for additional support, the plastic framing extrusions are ultrasonically spot welded to the legs of the corner key 100. A double tip welding head is typically used creating spot welds 106 and 107. Because the legs only loosely fit within the profile, the ultrasonic welding process allows the plastic to flow in the gap between the corner key legs and the profile extrusions creating an extra strong welded spot bond and reduced material flow on the exterior surface. Because of their complex profile shape, the corner keys 100 are typically injected molded and have to be manufactured from essentially the same base resin material as the extruded profiles 32 and 33.

One of the main advantages of using ultrasonic spot welding is that it is an assembly technique that joins two similar thermoplastic components at localized points with no preformed hole or energy director. In operation, the spot welding tips pass through the frame profile wall and the molten plastic displaced is shaped by a raised cavity in the tip (not shown) forming a neat, raised ring on the surface. Simultaneously, energy is released at the interface producing frictional heat. The tip then penetrates the corner key, displacing molten plastic material between the two surfaces and after the plastic has solidified, this forms a permanent structural bond between the framing profiles and the corner key legs.

Figure 15C:
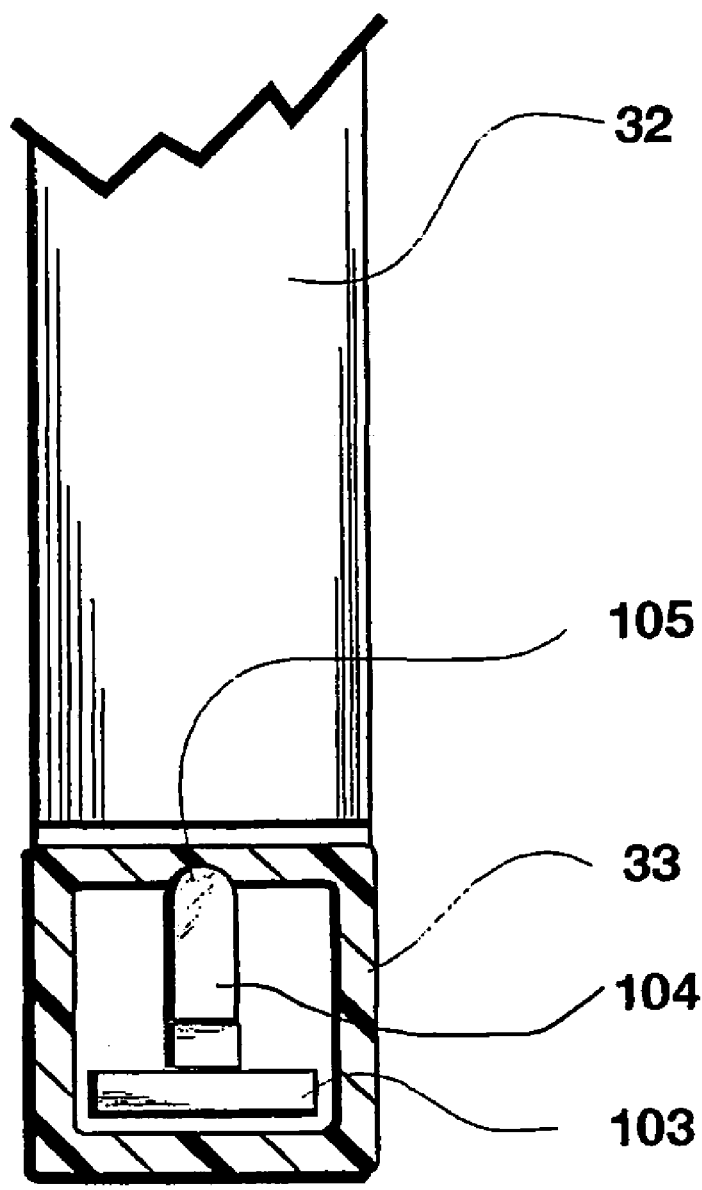
FIG. 15C is a cross section and elevation detail of the plastic framing profile and corner key as shown in FIG. 15A.

FIG. 15C shows a vertical cross-section through the hollow profile 33. The integral legs 101 of the corner key 100 consist of a rigid flat bar 103 with a central positioning fin 104. The profile extrusion 33 incorporates a half circular indentation and this allows the positioning fin 104 to be centrally located.

Figure 16:
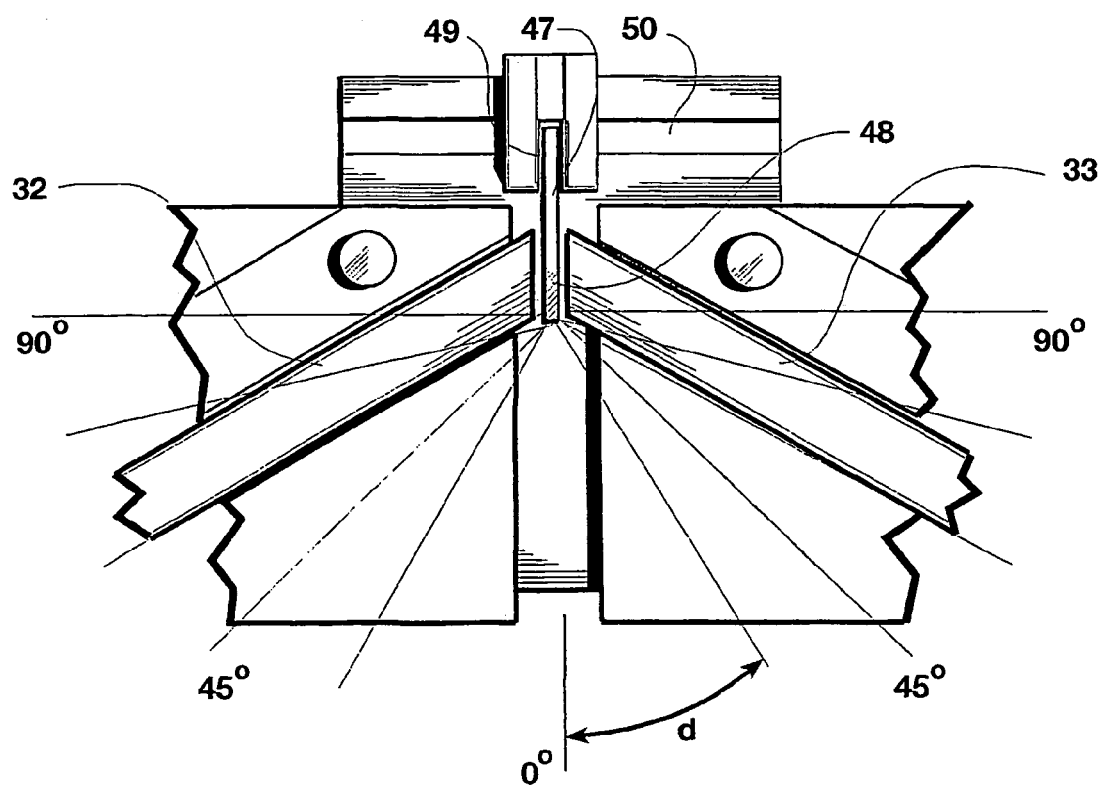
FIG. 16 is a fragmentary plan view of vibration welding apparatus showing that the framing profiles can be assembled at varying angles to the planar flange junction piece.

FIG. 16 shows a fragmentary plan of vibratory head 52 of the single corner friction corner welding apparatus 51 showing framing angle options. A junction piece 47 is centrally located and extruded profiles 32 and 33 are positioned against the vertical support members (not shown) and the angular displacement D of these support members can be varied from 90° to 15° and this allows for special shape frames to be manufactured.

Figures 17A, 17B:
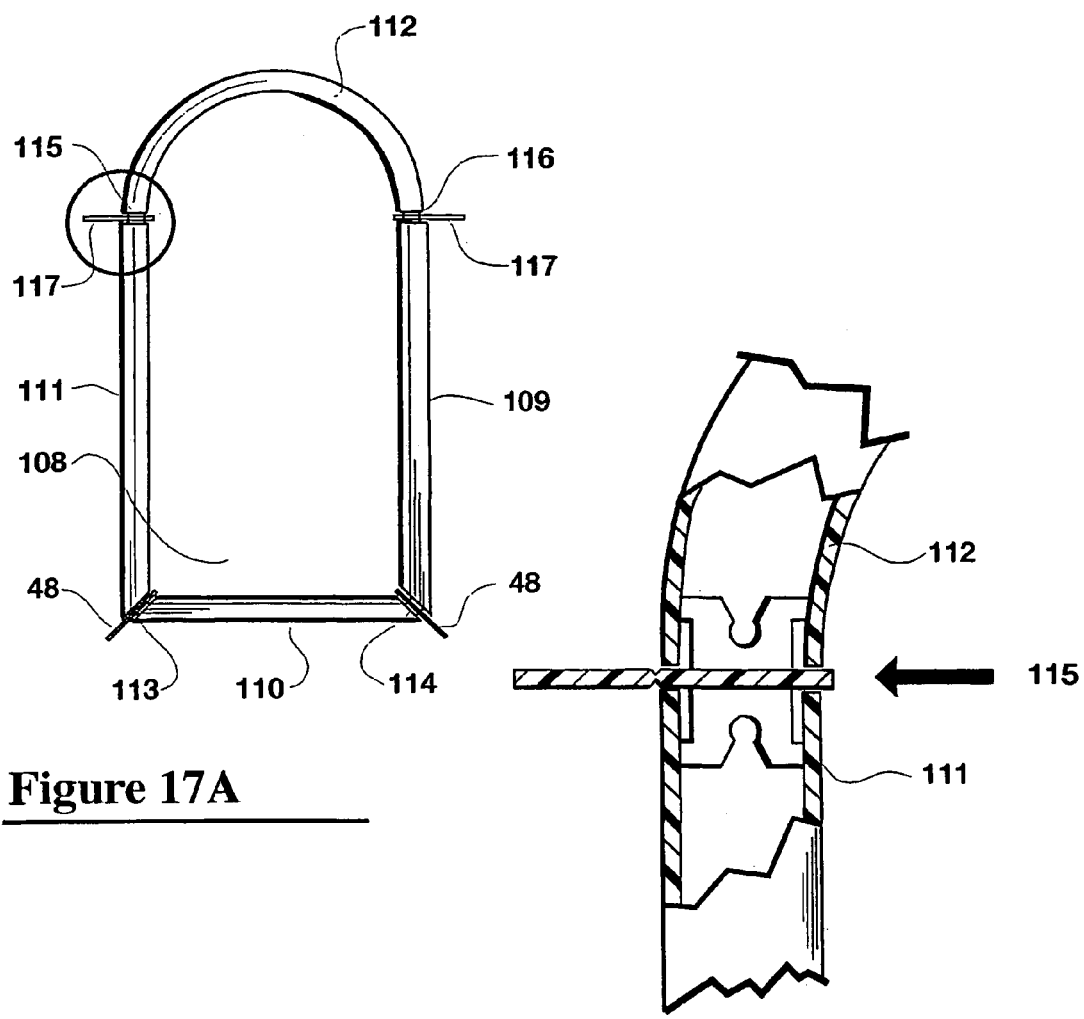
FIG. 17A is an elevation view of a round top window frame.
FIG. 17B is a cross section detail of a butt joint assembly between a straight and curved framing profile.

FIG. 17A shows an elevation view of a round top window frame 108. The straight framing profiles 109, 110, 111 are miter cut and vibration welded at the bottom corners 113 and 114 using planar flange junction pieces 48. At the butt joints 115 and 116 between straight framing profiles 109 and 111 and the round top profile 112, the profiles are straight cut and vibration welded together using special junction pieces 117.

FIG. 17B shows a cross section detail of the butt joint 115 between the straight framing profile 111 and round top or curved framing profile 112. The junction piece 117 incorporates legs that feature an integral spring centering device that simplifies the assembly of the window frame.

Figure 18:
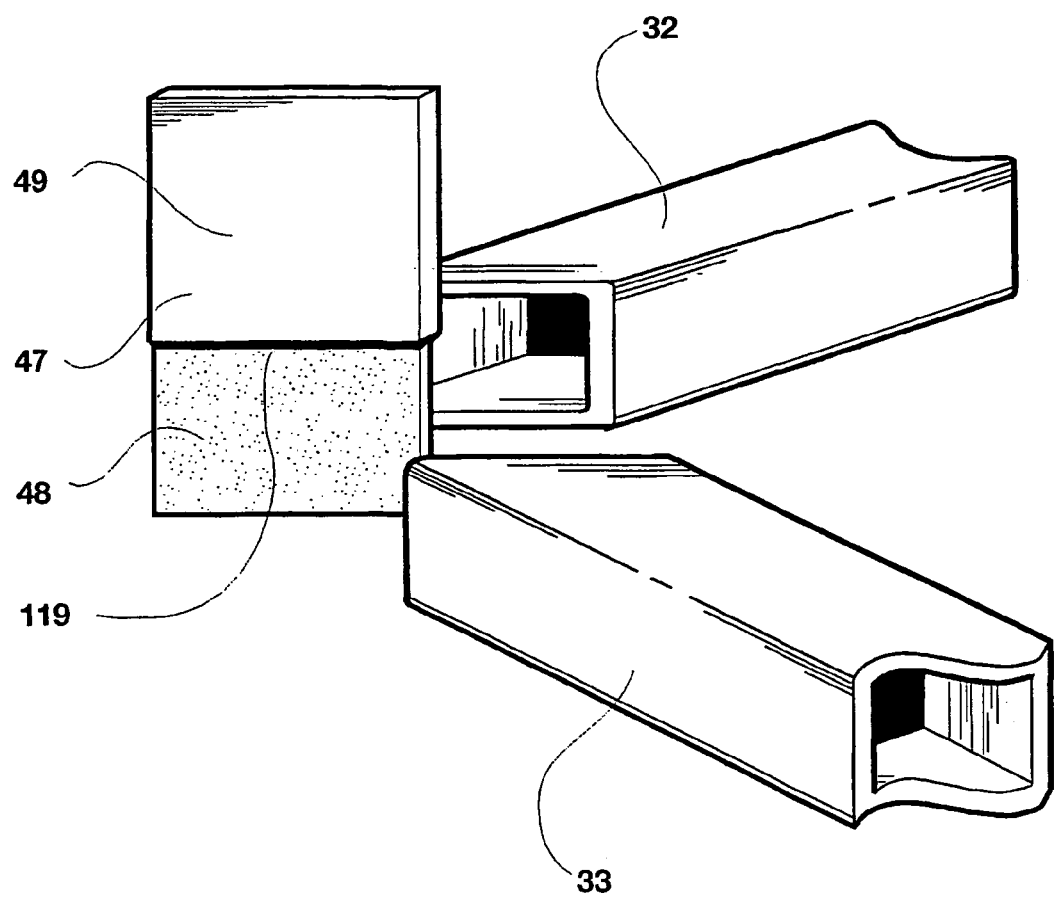
FIG. 18 is an exploded perspective view of a vibration welded corner frame assembly incorporating a junction piece with a planar flange and a top held removable tab.

FIG. 18 shows an exploded perspective view of a corner frame assembly where two framing profiles 32 and 33 are vibration welded to a junction piece 47 incorporating a planar flange and with a removable tab located on the top edge 119 of the planar flange 48. To provide for simplified handling at the framing profiles, the junction piece corner key fixture is typically attached to a flat plate located on the top surface of the vibratory head. However, the position of the vibratory head can be reversed so that the junction piece 47 is held from above and particularly for frame-and-panel assemblies, this reversed head position offers the advantage that both the panel and the final assembled unit can be more easily moved in-and-out of the vibration welding apparatus.

Figure 19A:
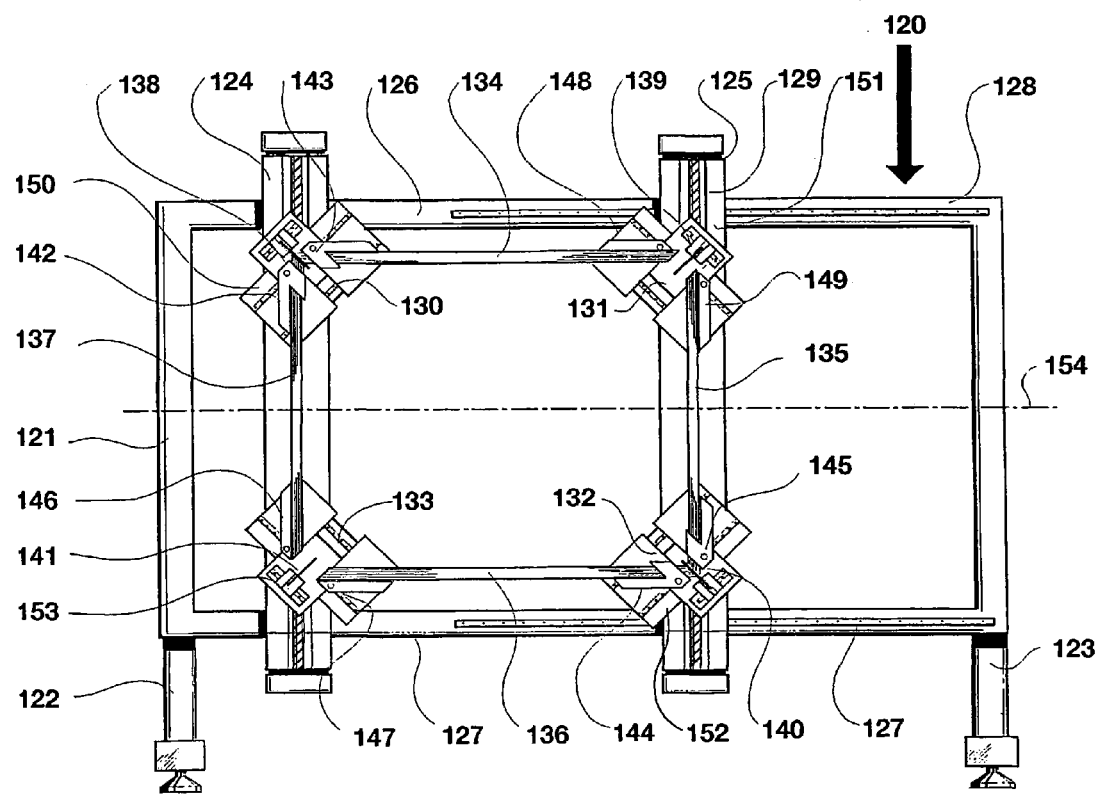
FIG. 19A and 19B are elevation views of a vertical four head vibration welding apparatus featuring two stage frame assembly.

Although frame assemblies can be manufactured using a single corner welder, it is more productive if two or more corners are welded simultaneously. FIG. 19A shows a front elevation view of a vertical four head vibration welder equipment 120. As with conventional hot plate welding equipment, the four head welding equipment 120 consists of a rectangular structural frame 121 with leg supports 122 and 123. The four welding heads 130, 131, 132 and 134 are attached to two vertical bridge supports 124 and 125 that span between the top beam 126 and bottom beam 127 of the structural frame 121. The first vertical bridge support 124 is fixed in position while the second bridge support 125 is moveable and is driven by a servo motor on a cog track located on the bottom beam 127 of the structural frame 121. The top end 129 of the moveable bridge 125 is supported by a guide rail 128 located on the top beam 126 of the structural frame 121.

A first set of vibration welding heads 130 and 133 are attached to the first bridge support 124 that is fixed in position and a second set of vibration welding heads 131 and 132 are attached to the second moveable bridge support 125. Each set of vibration welders are operated by a electro servo motor driven ball screw that in combination with special control devices allow the vertical position of each head to be individually controlled so that in operation, all four heads can move up and down either simultaneously or independently towards a central horizontal datum line 154. After the four heads 130, 131. 132 and 133 have moved to their initial start location, the four framing profiles 134, 135, 136 and 137 are loaded into position as well as the four junction pieces 138,139,140 and 141.

In contrast to a conventional four point welder where all four corners are welded simultaneously, the preferred operating strategy for friction welding is a two stage process. As shown in FIG. 19A, two diagonally opposite corners 150 and 152 are first welded together. For each corner weld, the process is essentially the same as with a single corner vibration welder. Both sets of framing profiles 134, 137 and 135,136 are independently pressurized against the two diagonally opposite corner keys 138 and 140. In addition, only the moveable frame clamping devices, immediately adjacent to the corner keys 138 and 140 are in operation. After the welding process is complete, the corner keys 138 and 140 have to be released and by incorporating as part of the vibratory welding head a tab removal shear press or a similar device (not shown), this allows for this release process to be carried out very efficiently.

Figure 19B:
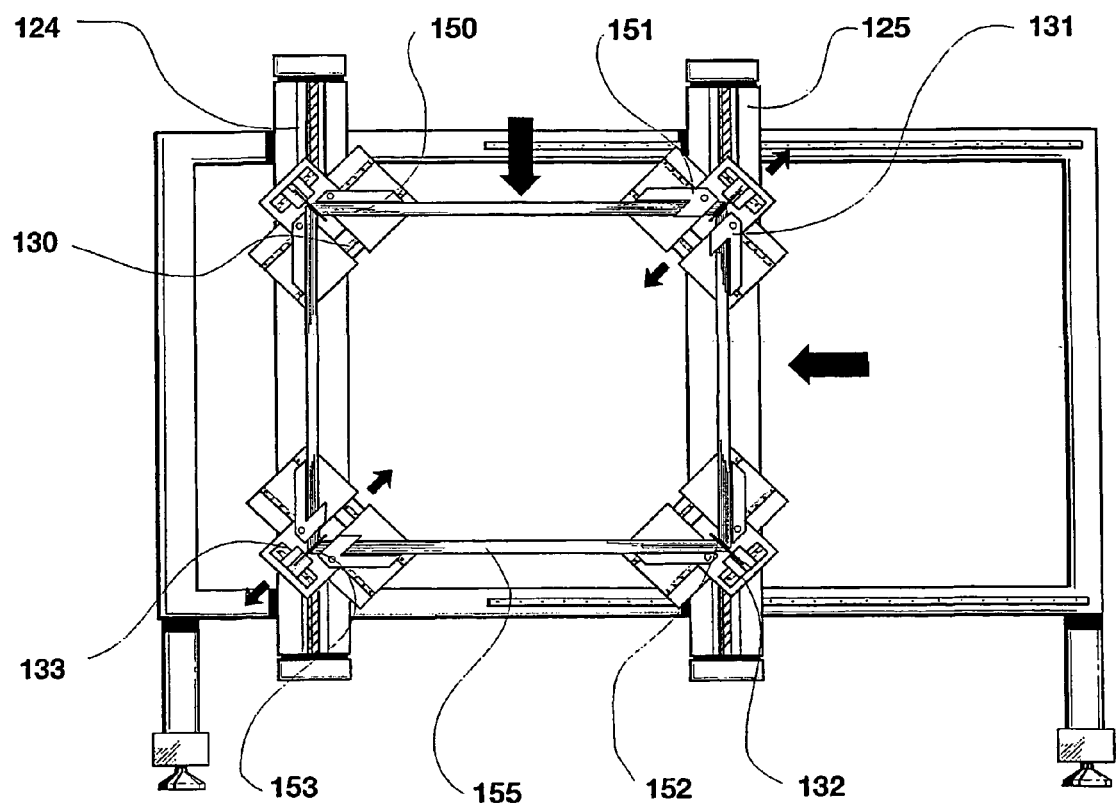

As shown in FIG. 19B, the next step is for the other set of diagonally opposite corners to be welded together. The bottom head 133 on the first vertical beam is fixed in position while both the top two heads 130 and 131 move downwards while simultaneously the second bridge support 125 moves sideways. During this second stage process, only the moveable frame clamping devices immediately adjacent to the corner keys 139 and 141 are in operation. After the second set of diagonally opposite corners 151 and 153 are welded, the assembled frame is then unloaded.

Because the friction welding process is so fast ( 3 to 6 seconds), this two stage process does not significantly increase cycle time and compared with simultaneously welding all four corners, the key advantage is that the required movement and control of the heads is greatly simplified. For the four head welder, the controllers for the individual heads form part of a coordinated control system (not shown) that controls all four heads as well as the operation of the other mechanized components of the automated four point welder.

For a conventional four head, hot plate welder, the overall cycle time is about 2 minutes and this overall cycle time includes: profile loading, corner welding, cool down and frame unloading. In comparison, the estimated overall cycle time for the two-stage vibration welding process is less than 30 seconds and so this represents a significant increase in productivity. To further improve productivity, one option is to incorporate an automated mechanical feed (not shown) for installing the junction pieces in the corner holding fixtures.

Figure 20:
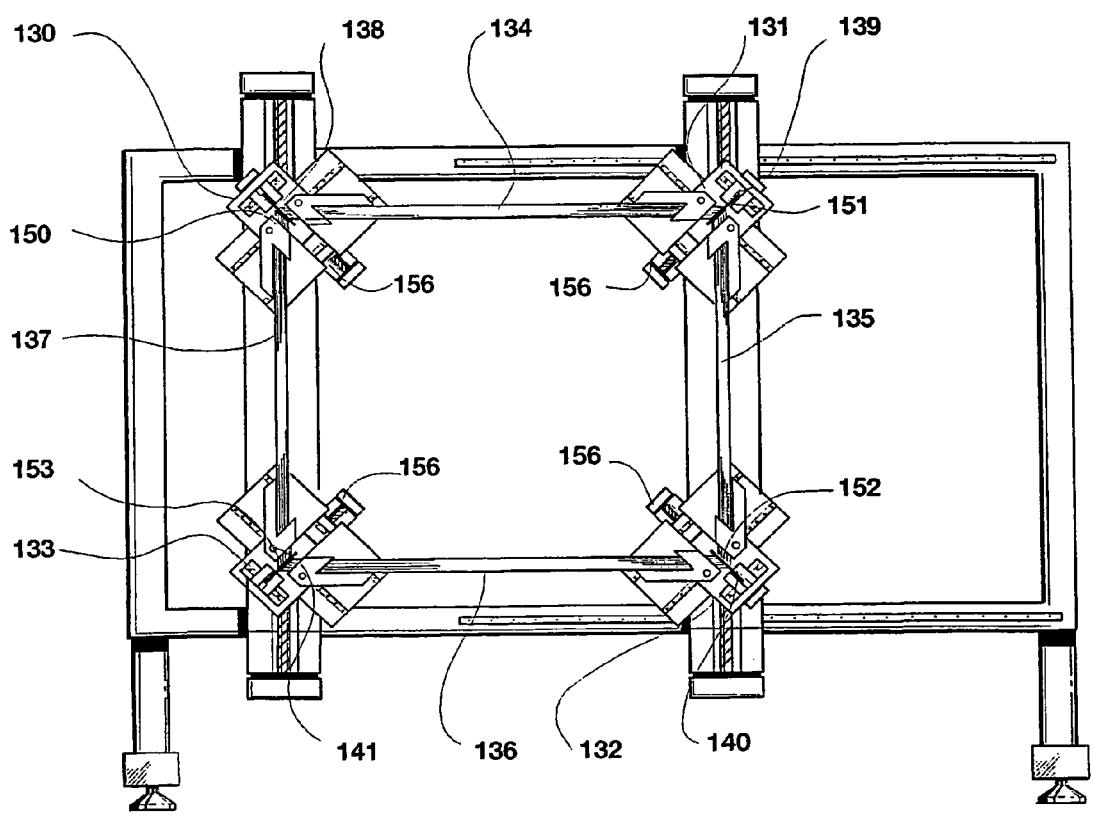
FIG. 20 is an elevation view of a vertical four head vibration welding apparatus where all four corners are simultaneously welded.

As shown in FIG. 20, it is technically feasible to simultaneously weld all four corners 150, 151, 152 and 153 in one operation. All four vibration welding heads 130, 132, 133 and 134 incorporate an additional servo motor 156 that allows each head to move fractionally as the plastic material is melted during the vibration welding process. As a result, the position of the heads can be fractionally adjusted in varying directions so that at four all corners, perpendicular pressure is simultaneously applied by the four framing profiles 134,135, 136 and 137 to the four corner keys 150, 151, 152 and 153. However because the head movements involved are so small and so complex, the control system for this simultaneous four headed welding operation is complex and requires very sophisticated software. Although FIGS. 18, 19 and 20 show vertical four head vibration corner welder, it can be appreciated by those skilled-in-the-art that the bridge supports can span horizontally on a table support.

Although vibration corner can generally be used to join together extruded plastic profile extrusions, the improved assembly method offers particular advantages for fenestration applications. In addition to the production of conventional windows and doors, the improved assembly method provides for the development of new types of fenestration products. To illustrate the performance advantages of vibration corner welding, FIGS. 21 to 31 show three examples of these new types of fenestration products, namely: 1. composite channel window panels, 2. glass panel units and 3. sealed frame window panels.

Compared to the simple rectangular frame assemblies illustrated in previous figures, these new types of fenestration products incorporate complex profile shapes, but it should be noted that the basic component joint design does not change and the planar flange junction piece can be configured to correspond to the miter joint contour of these more complex profiles shapes.

Figure 21A:
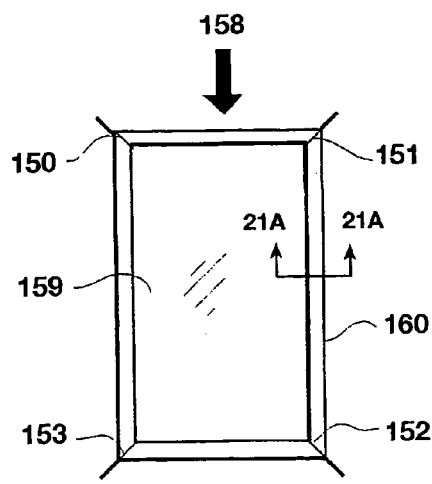
FIG. 21A is an elevation view of a composite channel sash window panel with the thermoplastic framing profiles assembled using vibration corner welding.

FIG. 21A shows an elevation view of a composite channel window panel 158 consisting of a conventional sealed double glazed unit 159 and a rectangular sash frame 160 that is assembled around the sealed glazing unit 159 using vibration corner welding.

Figure 21B:
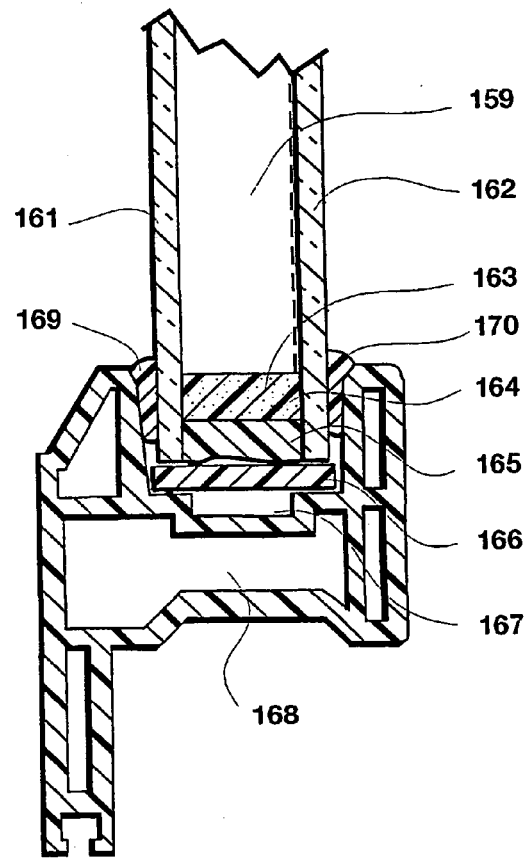
FIG. 21B is a vertical cross section detail taken on a line 21A—21A in FIG. 21A of a composite channel window panel incorporating a double glazed insulating unit.

FIG. 21B shows a cross section detail on a line 21A—21A of the composite channel window panel 158. The sealed double glazing unit 159 consists of two glazing sheets 161 and 162 and incorporates a conventional perimeter seal 163 with the specific example shown being an inner barrier seal 164 of desiccant filled polyisobutylene (TPS) and an outer structural seal 165 of polysulphide sealant. The sealed glazing unit 159 is supported on conventional hard rubber glazing blocks 166 and the glazing channel 167 is conventionally drained. After the multi-cavity hollow plastic frame has been assembled and welded at the corners, two silicone sealant beads 169 and 170 are applied in the gaps between the glazing unit 159 and the channel frame profile 168. Preferably, the window frame profile is made from glass fiber filled PVC and this has the advantage that because of the combined stiffness of glass-and-frame assembly, the overall frame profile size can be reduced when compared to conventional PVC window profiles.

Figure 22:
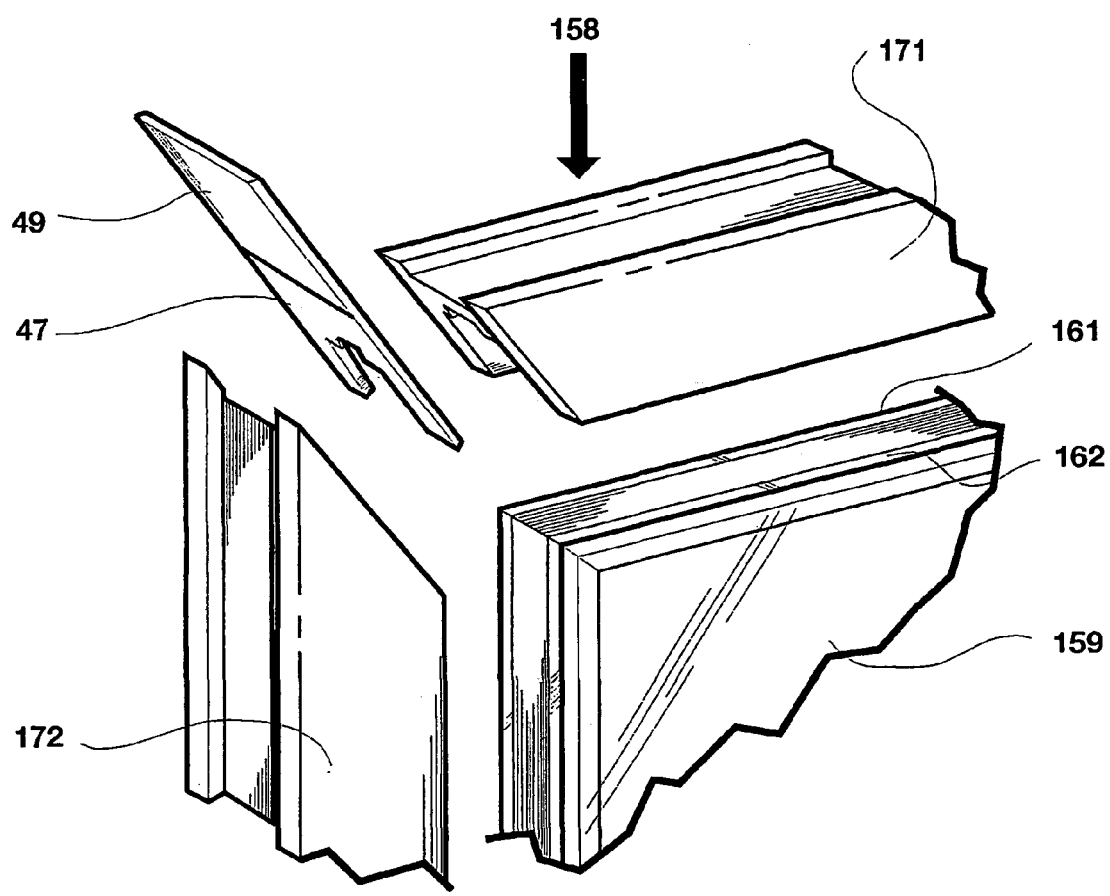
FIG. 22 is an exploded perspective view of a composite channel frame being assembled around an insulating glass unit using vibration corner welding.

FIG. 22 shows an exploded perspective corner detail of a composite channel window panel 158. The channel-shaped framing profiles 171 and 172 are assembled around the insulating glazing unit 159 and the framing profiles 171 and 172 are then joined and sealed at the corners using vibration corner welding. One key feature is that the junction piece 47 incorporates a removable plastic web 49 that is located on the outer side of the frame and is held in the corner web holding fixture attached to the vibratory head of the friction welding equipment. This has the advantage that the frame can be assembled around the insulating glass unit and the corners then welded and sealed. As a result, by eliminating the need to separately install the insulating glass unit 169, there are significant material and labor cost savings.

Figure 23:
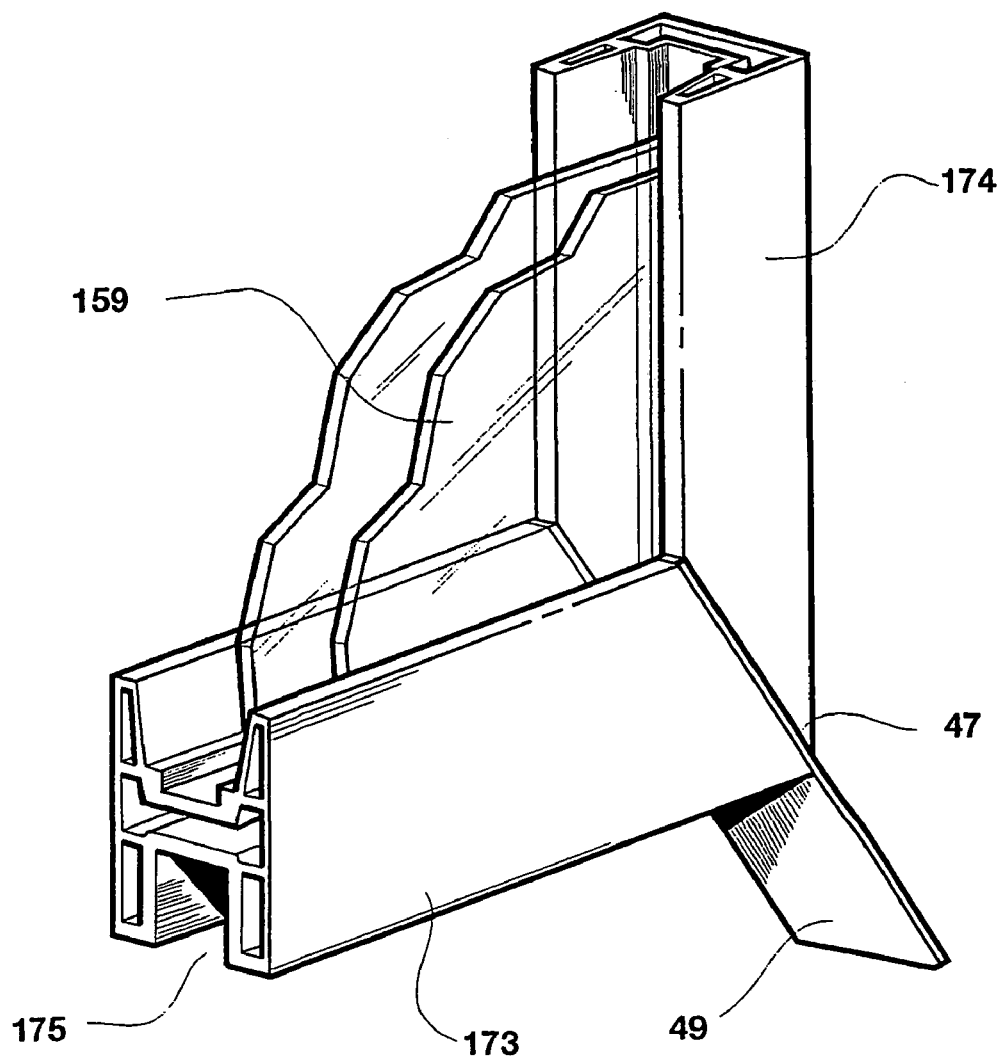
FIG. 23 is a perspective view of a corner assembly of a composite channel window incorporating different size framing profiles and assembled using vibration corner welding.

With conventional hot plate welding, in order for the thin wall profile walls to be welded together at the corners, the framing profiles have to be essentially the same size and shape. However with vibration corner welding, by using a common corner web, different profile sizes and shapes can be structurally joined together. For example as shown in FIG. 23, the bottom framing profile 173 is larger and incorporates a deep hardware channel 175 while the side framing profile 174 is smaller and there is no hardware channel. In addition, with conventional hot plate welding, only 45° miter cut corners can be used, while with a friction welding and a corner key web, it is feasible to join together framing profiles with different miter cut angled corners (i.e. 60° and 30°).

It should be noted that when joining together different size profiles using friction corner welding, it is necessary for the two moveable framing fixtures to apply different engagement forces so that when taking into account the different profile sizes, essentially the same pressure is being applied on either side of the web.

Although the examples given in FIGS. 21 to 24 show examples of a window framing profile being assembled around an insulating glass unit, it can be appreciated by those skilled-in-the-art that the same production process can also be used to fabricate a wide range of frame-and-panel products including: picture frames; mirrors; partitions; shower doors and cupboard doors.

Figure 24A:
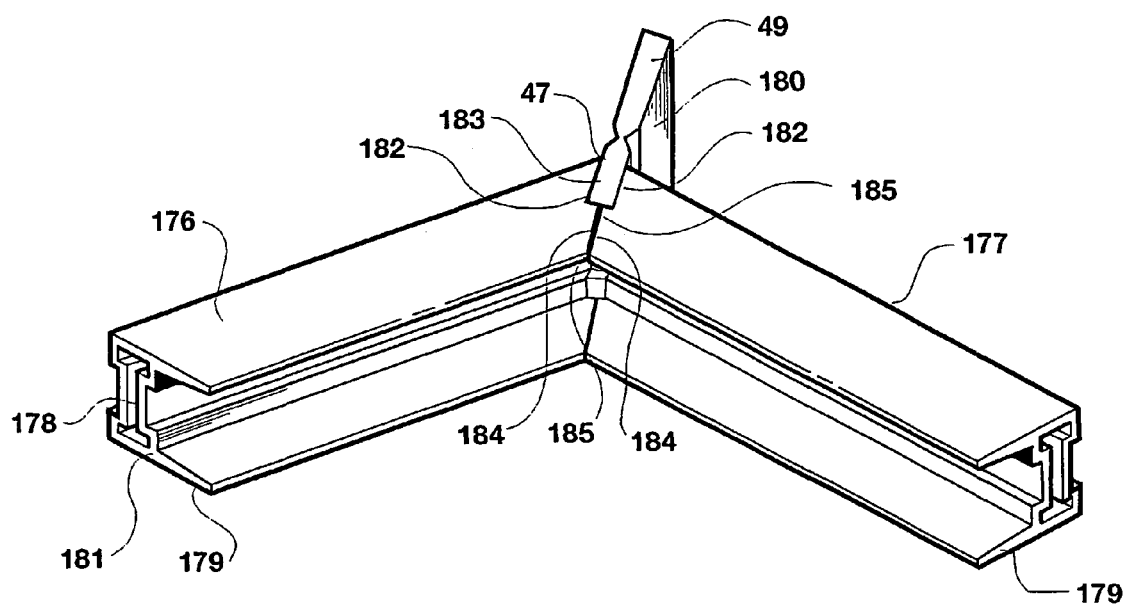
FIG. 24A is a perspective view of a vibration welded composite channel frame assembly where the framing profiles incorporate a single I-shaped cavity and thin solid frame profile walls for supporting the insulating glass unit.
Figure 24B:
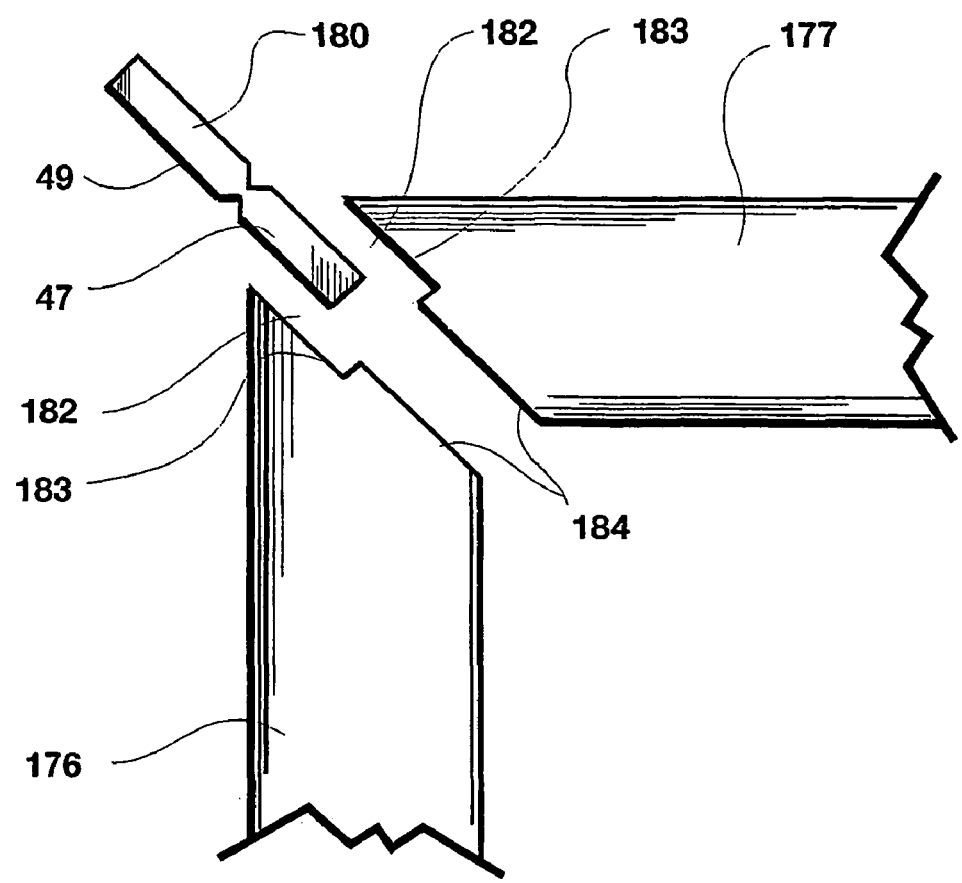
FIG. 24B is an exploded top view of the corner frame assembly shown in FIG. 24A.

FIGS. 24A and 24B show a perspective and top plan view of a welded composite channel frame assembly where the framing profiles 176 and 177 incorporate a single I-shaped cavity 178 and where the thin supporting profile walls 179 for the insulating glass unit are solid. The main advantage of this narrow composite channel profile is that the overall width of the framing profile is reduced and as a result, there are material and cost savings. One drawback of this narrow channel profile is that with a full section corner web, it is difficult to achieve a consistent corner weld because the legs of the channel-shaped corner web are so thin.

One option is for the corner web to only extend to the top profile wall 181 of the I-shaped cavity 178 and to incorporate a notch 182 in the miter cut corners of the framing profiles 176 and 177. As a result, while the bottom part of the profiles 183 is sealed and welded at the corners, the miter cut solid profile walls 184 only butt together. However because the vibration welding process can be closely controlled, the open gap 185 between the two miter cut profiles 176 and 177 can be kept to a minimum.

Figure 25A:
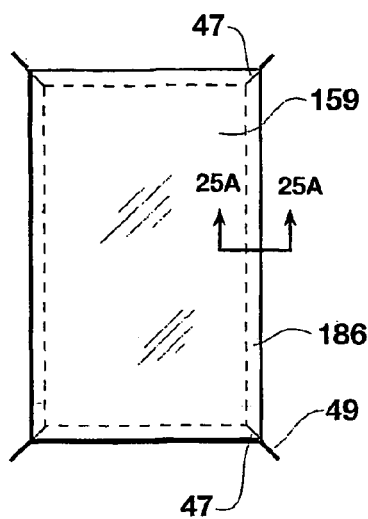
FIG. 25A is an elevation view of an insulating glass panel with a rigid thermoplastic spacer frame assembled using vibration corner welding.

FIG. 25A shows an elevation view of a sealed double glazed panel 159 incorporating a rigid thermoplastic spacer frame 186 that is welded and sealed at the corners using vibration corner welding.

Figure 25B:
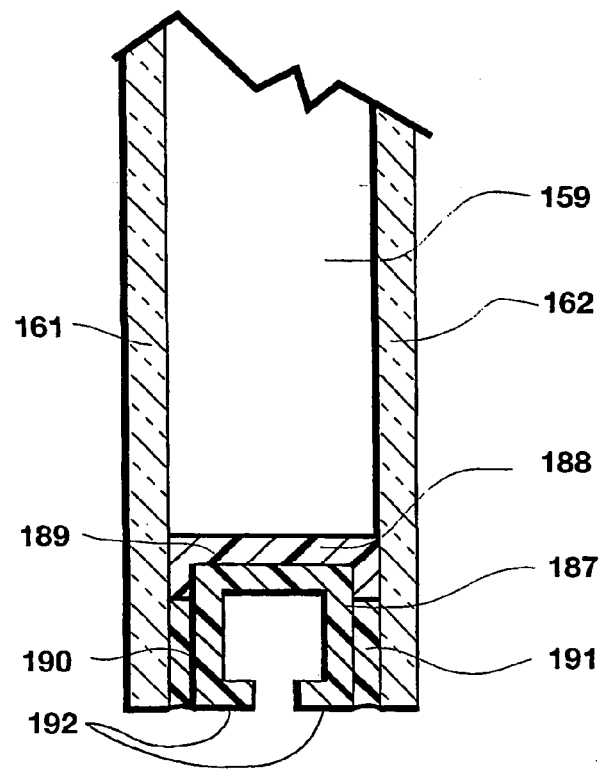
FIG. 25B is a vertical cross section detail taken on a line 25A—25A in FIG. 25A of the insulating glass panel incorporating a rigid thermoplastic spacer frame.

FIG. 25B shows a cross section detail on a line 25A—25A of the perimeter edge of the double glazed panel. The spacer frame 186 is made from an open channel, rigid thermoplastic framing profiles 187 that are vibration welded at the corners to planar flange junction pieces 47 made from essentially the same thermoplastic resin as the spacer profile. To minimize differential expansion between the glazing sheets 161 and 162 and the spacer frame 186, the thermoplastic spacer profiles are made from glass fiber re-enforced thermoplastic extrusions or continuous glass fiber re-enforced pultrusions. After the spacer frame 186 has been assembled, desiccant-filled polyisobutylene sealant is applied to the inner surface 188 of the spacer frame 186 creating a continuous barrier seal. After the panel has been assembled, double beads 190 and 191 of structural thermosetting sealant are applied between the spacer frame 186 and the two glazing sheets 161 and 162.

For insulating glass panels, the main advantage of using vibration corner welding is that there is a continuous, single wall barrier seal made from rigid thermoplastic material. As a result, the back face 192 of the spacer frame can incorporate a variety of profile features including attachment devices. In addition without damaging the integrity of the barrier seal, other thermoplastic parts (e.g. gas fill patches) can also be welded to the back face 192 of the spacer frame 186.

Figure 26A:
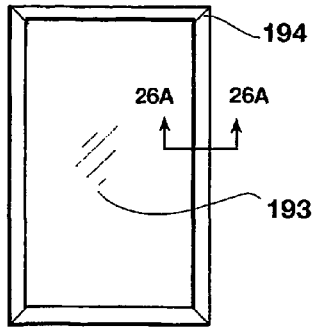
FIG. 26A is an elevation view of a sealed frame window panel where the outer glazing sheets are directly adhered to the frame assembly.

FIG. 26A shows an elevation view of a sealed frame, triple glazed sash window panel incorporating a perimeter sash frame 194 with vibration welded corners.

Figure 26B:
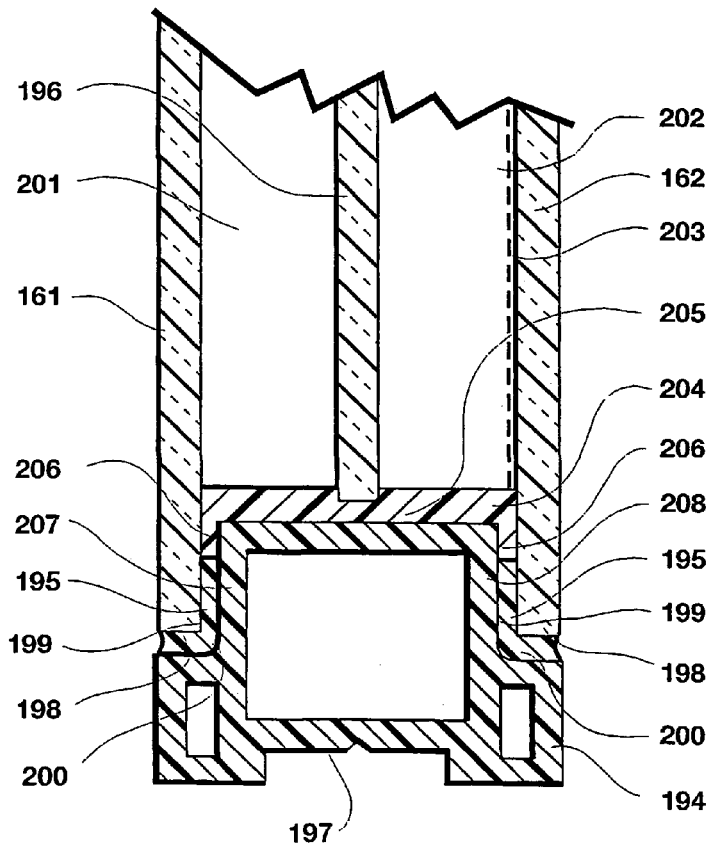
FIG. 26B is a vertical cross section detail taken on a line 26A—26A in FIG. 26A of a sealed frame window panel as shown in FIG. 26A.

FIG. 26B shows a cross section detail on a line 26A and 26A of a triple glazed, sealed frame window panel 193. The panel consists of two glazing outer sheets 161 and 162 that overlap the perimeter sash frame 194 and are adhered to the frame with thermosetting structural sealant 195. The inner center glazing sheet 196 is supported by the perimeter frame 194.

The perimeter frame 194 is assembled from glass-fiber filled, hollow thermoplastic profiles 197 which are joined and sealed at the corners using vibration corner welding. The thermoplastic profiles incorporate glass fiber fill and as previously noted this provides for increased strength and rigidity as well as reduced thermal expansion. Compared to conventional window assembly, the main advantage of sealed frame glazing unit is that through composite structural action, the required size of the sash profiles 197 can be significantly reduced resulting in improved energy efficiency and material cost reductions.

With composite structural action, the sealed frame panel performs in a similar manner to a stressed skin sandwich panel where the perimeter edges of the two glazing sheets 161 and 162 are respectively in compression and tension and so instead of the panel performing as two independent glazing sheets, the two sheets 161,162 act together as a structural unit.

The glazing sheets 161 and 162 are structurally adhered to the plastic frame profiles 197 with structural thermosetting sealant 195 and for long term durability, silicone sealant is the preferred material. For enhanced composite structural performance, a high modulus silicone sealant is required with the thickness of sealant being preferably less than 3 mm. To provide for increased panel stiffness, both the bottom edges 198 and perimeter side edges 199 of the glazing sheets 161 and 162 are adhered to L-shaped seats 200 on either side of the perimeter frame profiles 197. To allow glazing sheets 161 and 162 to bow in and out with changes in temperature and pressure, the side edge contact length is kept to a minimum with 10 mm being the typical length required.

A third center glazing sheet 196 is located between the two outer glazing sheets 161 and 162 and this glazing sheet is similar in shape but smaller in size than the outer two glazing sheets. For improved thermal performance, the width of the cavity spaces 201 and 202 between the glazing sheets 161, 196 and 162 is typically between 9 and 18 mm. For improved energy efficiency, a low-e coating 203 can also be applied to one or more of the glass cavity surfaces of the window panel 193. In addition, the cavity spaces 161 and 162 can incorporate a low conductive gas such as argon or krypton.

To provide for long term gas retention as well as maintaining the integrity of the perimeter edge seal, there is a need for a continuous perimeter edge seal between the outer glazing sheets. Various edge seal configuration sand sealant materials can be used to provide this continuous barrier seal. One option as shown in FIG. 26B is to apply low permeable sealant material 204 to the front face 205 and front side edges 206 of the perimeter frame 194. To accommodate glass bowing and movement, the sealant material must be flexible and because of its low temperature performance, polyisobutylene is the preferred material. To remove moisture vapor from the glazing cavity spaces 201 and 202, the low permeable sealant incorporates desiccant fill material with the preferred material combination being 85 percent 3A molecular sieve and 15 percent silica gel.

The rigid frame profiles 197 can be made from many alternative plastic materials produced using various processes. One preferred material is glass fiber-filled polyvinyl chloride (PVC) that is extruded to the required profile shape. One suitable product is Fiberloc 80530 that features a 30 percent glass fiber fill and is produced by PolyOne Inc. of Cleveland Ohio. The co-efficient of thermal expansion of the 30 percent, glass fiber filled material is $18\times10^{-6}$ cm/cm/° C. and this compares to the thermal coefficient of glass which is $9\times10^{-6}$ cm/cm/° C. For very large panel sizes, the thermal expansion of the plastic profiles can be further reduced by reinforcing the frame profile walls 207 and 208 adjacent to the outer glass sheets 161 and 162 with continuous unidirectional glass fiber strips (not shown).

Instead of fiber glass reinforced PVC, the frame profiles 197 can be made from various other alternative plastic materials, including: thermoplastic fiber glass pultrusions, glass fiber reinforced engineering structural plastic foam extrusions and high draw oriented thermoplastic extrusions. Because the plastic profiles are firmly bonded to the glazing sheets and expand outwards from the mid points of the perimeter frame, maximum stress due to the differential expansion between the plastic profiles and the glass sheets occurs at the corners. Particularly with glass fiber filled profiles, because the corner welds are typically only as strong as the un-reinforced plastic, the corner welds can be a potential weak point in the frame assembly. To provide for increased strength and rigidity and to also reduce stress on the corner welds, the preferred assembly method is to join the plastic profiles together at the corners using a combination of friction corner welding and ultrasonic spot bonding and this production method has previously been described in FIGS. 15A and 15B.

Figure 27A:
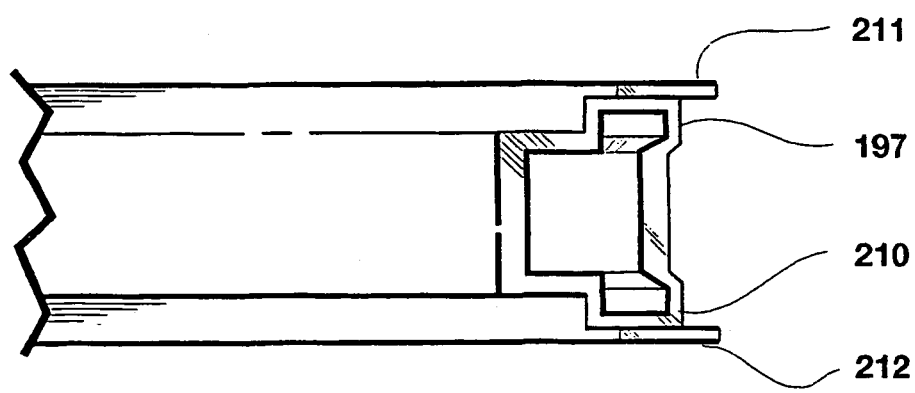
FIGS. 27A and 27B are front and side elevation views of a corner end of a framing profile specifically fabricated for friction corner welding of sealed frame panels.
Figure 27B:
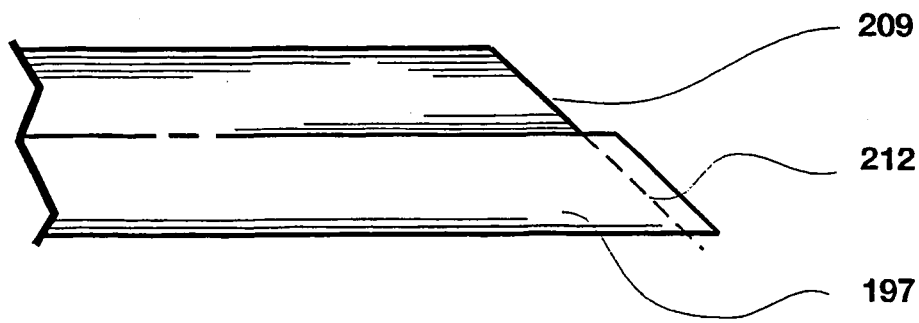

FIGS. 27A and 27B show a front elevation (FIG. 27A) and a side elevation (FIG. 27B) view of the diagonal cut end 209 of the framing profile for a triple glazed sealed sash window panel. By removing the frame profile material, a 3 to 4 mm deep channel 210 is formed in the diagonal cut end of the profile 209 creating plastic side ribs 211 and 212. The dotted line 212l on the side elevation of the diagonal cut end indicates the depth of the channel 210.

Figure 28:
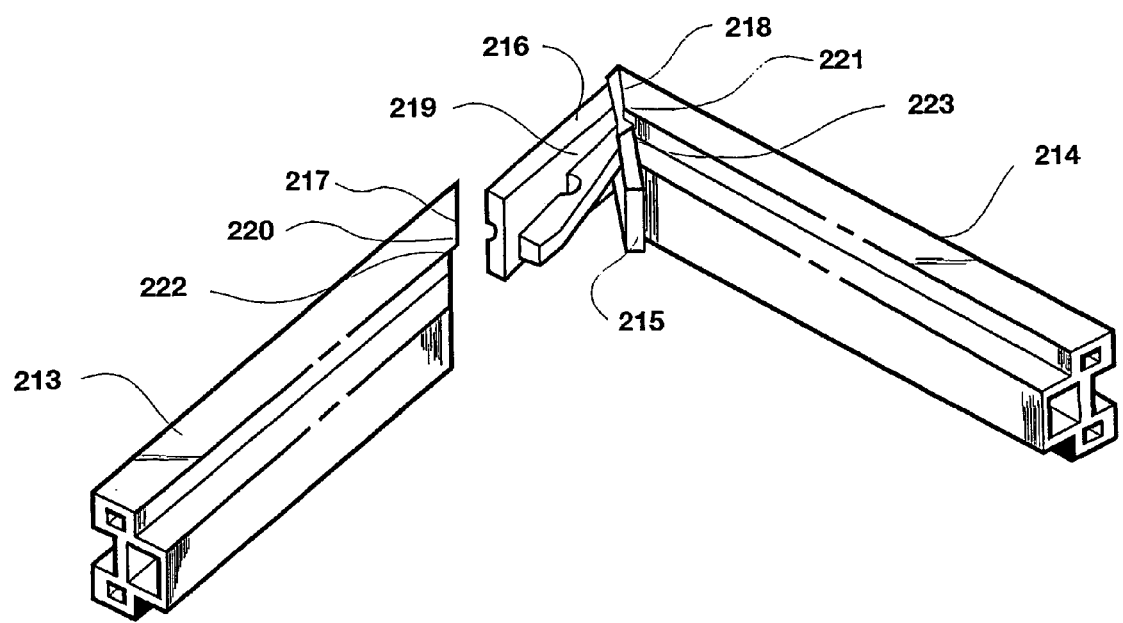
FIG. 28 is an exploded perspective detail of a corner frame assembly for a sealed frame window panel as shown in FIG. 26A.

FIG. 28 shows an exploded perspective detail of the corner frame assembly for a triple glazed, sealed frame window panel 193. The two framing profiles 213 and 214 are joined together by means of special corner keys incorporating a planar flange web 215 and integral legs 216. To provide for simplified frame assembly, the integral legs incorporate a self centering spring device.

As previously shown in FIGS. 27A and 27B, by removing the frame profile material, a channel can be formed in the miter cut ends 217 and 218 of the framing profiles 213 and 214 so that the top side rib surfaces 220 and 221 overlap the diagonal center flange 215 of the corner key 217. During the friction welding process, the profile ends except for the top side ribs 220 and 221 are pressured against the center flange 215. Because plastic flash is only generated at the interface between the profiles ends 222 and 223 and the corner key flange 215, a clean parting line is created between the two top side ribs 220 and 221 of the framing profiles 213 and 214.

FIGS. 29A to 29E show the production steps involved in manufacturing a single, vibration-welded, sealed-frame corner assembly.

As shown in FIG. 29A, the sealed frame corner assembly consists of two framing profiles 213 and 214 and a special L-shaped corner key 219 with a diagonal center flange 215 and a removable tab 224. A channel is formed in the miter cut ends of the framing profiles 213 and 214 so that the top side ribs 220 and 221 of the framing profiles overlap the diagonal center flange 215 of the corner key 219.

As shown in FIGS. 29B and 29C, the two legs 225 and 226 of the L-shaped corner key 219 are loosely fitted into the two framing profiles and the corner assembly is placed in the vibration corner welding apparatus. The removable tab 224 incorporates a special arrow-head profile 227 that fits into a complementary shaped insert hole 228 within the corner key fixture 229. The framing profiles 213 and 214 are held firmly in position by means of front clamping devices 230 and 231 that are attached to the moveable framing fixtures 232 and 233 of the vibration welding apparatus (not shown).

As shown in FIGS. 29C and 29D, the two profiles are pressured using perpendicular force against the contact surfaces of 234 and 235 of the corner key 219 and friction is created by rapidly moving the corner key 219 back and forth. During the friction welding process, as the two profiles 213 and 214 are pressured against the corner key flange 215, plastic flash flows to either side of the contact surface. Because relatively limited flash is produced, the flash does not extend into joint line between the two diagonal cut ends 236 of the framing profiles and so as a result, a clean parting line 237 is created between the framing profiles.

After the friction welding process is complete and as shown in FIG. 29E, the tab 224 is mechanically removed from the L-shaped corner key 219. The final step in the production process is to bond the interior profile walls to the L-shaped corner keys using ultrasonic spot welding 238.

The invention claimed is:

1. A method for forming a vibratory welded connection between first and second members and a junction piece where said members and said junction piece are composed at least in part of thermoplastic resin material, said method comprising providing a vibratory head;

providing a junction piece having a first portion for welding to said first and second members and a second portion extending from said first portion for mounting to a fixture connected to said vibratory head and for supporting said first portion from said fixture;

mounting the second portion of said junction piece to a fixture connected to said vibratory head;

mounting said first and second members in fixtures that are independent of said vibratory head;

creating an engagement force between each of said first and second members and a respective opposite side of said first portion of said junction piece;

maintaining said engagement forces while vibrating said junction piece by means of said vibratory head at a frequency of from 50 to 500 Hz to create friction generated heat to melt material on the ends of said members and on each respective opposite side of the first portion of said junction piece, such melted material upon cooling forming a weld between said junction piece and said members;

where said engagement forces between said first and second members and said junction piece are applied separately from the operation of the vibratory head, wherein said first portion of said junction piece has a planar flange that extends at an angle with respect to each said member, where said second portion of said junction piece incorporates a removable tab that is an extension of said planar flange, and where said removable tab is held in said fixture that is connected to said vibratory head.

2. The method of claim 1 wherein the engagement forces are controlled to provide even pressure on each side of said junction piece.

3. The method of claim 1 where each said engagement force is applied perpendicular to the plane of the movement of said vibratory head.

4. The method of claim 1 wherein each said engagement force is varied such that after melting has been achieved, each engagement force is reduced to a level where the melted material remains largely in position between the ends of the members and the junction piece.

5. The method of claim 1 wherein said junction piece incorporates insert holes and where said fixture for the junction piece incorporates insert pins of similar profile shape to the insert holes in said junction piece.

6. The method of claim 1 wherein the method also incorporates the step of removing the tab after the vibratory weld connection is completed.

7. The method of claim 1 wherein said removable tab is located on an outer edge of said planar flange and where said tab incorporates a T-shaped geometric shape that is held in position by a fixture incorporating an insert hole with a similar geometric shape as the removable tabs said fixture being configured to grip said removable tab and to ensure that the junction piece is held firmly in position.

8. The method of claim 1 wherein the vibratory corner welding process is controlled by adjusting the duration of the operation of the vibratory head for a specified amplitude, frequency and engagement force.

9. The method of claim 1 wherein said junction piece includes at least one feature for receiving plastic flash generated during the welding process.

10. The method of claim 1 wherein said junction piece includes at least one recess for receiving plastic flash generated during the welding process.

11. The method of claim 1 wherein said junction piece includes a welding bead.

12. The method of claim 1 wherein said junction piece includes at least one preformed hole.

13. The method of claim 1 wherein said junction piece comprises glass fiber filled thermoplastic material.

14. The method of claim 1 wherein said junction piece is made from a stiffer thermoplastic material than that from which said first and second members are made.

15. The method of claim 1 wherein said first portion of said junction piece has a thickness of less than 1.5 mm.

16. The method of claim 1 wherein said junction piece is injection molded.

17. The method of claim 1 wherein said planar flange has a thickness in the range of 2 to 12 mm.

18. The method of claim 1 wherein said first and second members comprise material selected from the group consisting of: thermoplastic foam material, wood fiber filled thermoplastic material, glass fiber reinforced thermoplastic material, and polyvinyl chloride material.

19. The method of claim 1 wherein decorative coatings or finishes are incorporated on outer surfaces of said first and second members.

20. The method of claim 1 wherein said first and second members on adjacent opposite sides of said junction piece are of different profile shapes.

21. The method of claim 1, wherein the operations of providing a junction piece, mounting, maintaining, and vibrating are repeated at each of a plurality of junctions between adjacent ends of a plurality of elongate frame members for interconnecting the elongate frame members to form a closed frame.

22. The method of claim 21 wherein said frame is a rectangular frame.

23. The method of claim 21 wherein said frame members are assembled at different angles to said junction piece and where said angles range from 90° to 15°.

24. The method of claim 23 wherein the angles of adjoining frame members with respect to said junction piece are different.

25. The method of claim 21 where at least one of said frame members is curved along its longitudinal axis.

26. The method of claim 21 wherein the ends of the frame members are miter cut.

27. The method of claim 21 wherein the ends of the frame members are miter cut and where a dado cut is fabricated in the miter cut ends of the framing members except for one or both of upper and lower faces of said frame members.

28. The method of claim 21 wherein the ends of the frame members are miter cut and where a dado cut is fabricated in the miter cut ends of the frame members except for front and back sides of said frame members.

29. The method of claim 21 wherein the frame members are assembled around an inner panel prior to said frame members being welded together.

30. The method of claim 21 wherein the frame members are assembled around an inner panel prior to said frame members being welded together and where said panel is selected from the group consisting of: flat glass sheets, rigid plastic sheets, plastic multi-cavity sheet extrusions, and insulating glazing units.

31. The method of claim 21 wherein the frame members are assembled around an insulating glass unit prior to said frame members being welded together and where sealant is applied in gaps between the assembled frame and the insulating glass unit.

32. The method of claim 21 wherein after said frame is formed, glazing sheets are directly adhered to the sides of the frame members using sealant.

33. The method of claims 21 wherein after said frame is formed, the frame is located between spaced glazing sheets.

* * * * *

UNITED STATES PATENT AND TRADEMARK OFFICE
CERTIFICATE OF CORRECTION

| | | |
|---|---|---|
| PATENT NO. | : 7,122,088 B2 | Page 1 of 1 |
| APPLICATION NO. | : 10/473677 | |
| DATED | : October 17, 2006 | |
| INVENTOR(S) | : Stephen Field et al. | |

It is certified that error appears in the above-identified patent and that said Letters Patent is hereby corrected as shown below:

Column 21, line 38, claim 7, "...tabs..." should be --...tab,...--.

Signed and Sealed this

Sixth Day of March, 2007

JON W. DUDAS
*Director of the United States Patent and Trademark Office*